US012591267B2

(12) United States Patent
Kim et al.

(10) Patent No.: US 12,591,267 B2
(45) Date of Patent: Mar. 31, 2026

(54) APPARATUSES AND METHODS FOR ADJUSTING SKEWS BETWEEN DATA AND CLOCK

(71) Applicant: SAMSUNG ELECTRONICS CO., LTD., Suwon-si (KR)

(72) Inventors: Tongsung Kim, Suwon-si (KR); Woojung Kim, Suwon-si (KR); Yoonji Park, Suwon-si (KR); Younghoon Son, Suwon-si (KR); Seonkyoo Lee, Suwon-si (KR); Ilyoung Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/756,305

(22) Filed: Jun. 27, 2024

(65) Prior Publication Data

US 2025/0103091 A1    Mar. 27, 2025

(30) Foreign Application Priority Data

Sep. 26, 2023    (KR) ........................ 10-2023-0129554

(51) Int. Cl.
*G06F 1/08*          (2006.01)
*G06F 1/10*          (2006.01)
(52) U.S. Cl.
CPC . *G06F 1/08* (2013.01); *G06F 1/10* (2013.01)
(58) Field of Classification Search
CPC ................ G06F 1/08; G06F 1/10; G06F 1/12
See application file for complete search history.

(56) References Cited

U.S. PATENT DOCUMENTS

| | | | |
|---|---|---|---|
| 7,800,963 B2 | 9/2010 | Chung et al. | |
| 10,686,582 B1 | 6/2020 | Pasdast et al. | |
| 10,978,118 B1 | 4/2021 | Yu et al. | |
| 11,200,941 B2 | 12/2021 | Park | |
| 12,205,668 B2 * | 1/2025 | Choi | G11C 29/50012 |
| 2014/0241465 A1 * | 8/2014 | Itoigawa | H04L 25/0272 |
| | | | 375/316 |
| 2019/0058576 A1 * | 2/2019 | Lim | H04L 7/0334 |
| 2022/0270665 A1 * | 8/2022 | Park | G11C 29/022 |
| 2024/0144991 A1 * | 5/2024 | Jeong | G06F 1/12 |

FOREIGN PATENT DOCUMENTS

| | | |
|---|---|---|
| JP | 2007-133526 A | 5/2007 |
| JP | 2007-249738 A | 9/2007 |
| KR | 10-2014-0041207 A | 4/2014 |
| KR | 10-2014-0124202 A | 10/2014 |

* cited by examiner

*Primary Examiner* — Raymond N Phan
(74) *Attorney, Agent, or Firm* — Sughrue Mion, PLLC

(57)          ABSTRACT

Provided are an apparatus and a method for adjusting a skew between data and a clock. The apparatus driven by a supply voltage includes a clock circuit that adjusts a skew between data and a clock. The clock circuit performs a first loop operation through a first loop and a second loop operation through a second loop, based on a phase difference between data and a clock. The first loop operation is performed until there is no phase difference between the data and the clock, and the second loop operation is performed until a first slope representing a change in delay of the data with respect to the levels of the power voltage and a second slope representing a change in delay of the clock become identical to each other.

20 Claims, 20 Drawing Sheets

100

EO2

DQ　　　　　　　　　　　　　　VCCQ_HV

DQS　　　　　　　　→　B

EO1

DQ　　　　　　　　　　　　　　VCCQ_LV

DQS　　　　　　　　←　A

SKEW1

▨ :Don't care

DQ　　　　　　　　　　　　　　VCCQ_HV

DQS　　　　　　　　→　D

DQ　　　　　　　　　　　　　　VCCQ_LV

DQS　　　　　　　　←　C

SKEW2

▨ :Don't care

APPARATUSES AND METHODS FOR ADJUSTING SKEWS BETWEEN DATA AND CLOCK

CROSS-REFERENCE TO RELATED APPLICATION

This application is based on and claims priority under 35 U.S.C. § 119 to Korean Patent Application No. 10-2023-0129554, filed on Sep. 26, 2023, in the Korean Intellectual Property Office, the disclosure of which is incorporated by reference herein in its entirety.

BACKGROUND

1. Field

The disclosure relates to semiconductor devices, and more particularly, to apparatuses and methods for adjusting skew between data and clocks according to fluctuations of a power voltage.

2. Description of Related Art

Due to increased demands for increased operating speeds, increased data capacity, and reduced power consumption of electronic systems, semiconductor memories that may be accessed faster, store more data, and consume less power are continuously being developed. A semiconductor memory is generally controlled by providing commands, addresses, and clocks to a memory device. Various commands, addresses, and clocks may be provided by, for example, a memory controller. Commands may control the memory device to perform various memory operations, e.g., a read operation for retrieving data from the memory device and a write operation for storing data in the memory device. Data associated with commands may be provided between the memory controller and the memory device at known timings relative to reception and/or transmission by the memory device.

A clock (e.g., DQS) provided to the memory device may be used to generate internal clock signals that control timings of various internal circuits during a memory operation. The memory device may capture signals received from the memory controller in response to a DQS clock, e.g., a command, an address, and/or data DQ, and synchronize data DQ to be transmitted to the memory controller with the DQS clock. As the frequency of a DQS clock provided from the memory controller increases in accordance with the demand for a high data transfer rate, it is important for the memory device to accurately capture transmitted data DQ.

A memory device may capture data DQ transmitted from a memory controller in response to a received DQS clock. At this time, to prevent a data capture operation from malfunctioning due to external power noise, the memory device may be designed to perform the data capture operation using an internal voltage different from an external power supply. The memory device may generate an internal voltage derived from an external power supply by using an internal voltage generation circuit.

However, when the memory device captures data DQ in response to a DQS clock by using an internal voltage, the data capture operation may malfunction when internal voltage noise occurs. Also, memory devices may consume power for generating an internal voltage. Therefore, a data capture method that is safe from external power noise even when an external power supply is used instead of an internal voltage is needed.

SUMMARY

The disclosure provides apparatuses and methods for adjusting skew between data and clocks according to fluctuation of a power voltage.

According to an aspect of the disclosure, an apparatus driven by a power voltage includes: a clock circuit including: a clock delay scheduler; a first count logic circuit; and a scheduler controller, wherein the clock circuit is configured to receive a clock signal and adjust a skew between a data signal and the clock signal; and a data input circuit including a sampler circuit configured to receive the data signal and latch the data signal in response to a second clock signal provided by the clock delay scheduler, wherein a first loop includes the clock delay scheduler, the sampler circuit, and the first count logic circuit, and a second loop includes the scheduler controller and the clock delay scheduler, wherein the first count logic circuit is configured to receive the data signal from the sampler circuit and to generate a first count code based on a phase difference between the clock signal and the data signal, wherein the clock delay scheduler is configured to adjust a delay of the clock signal based on a second count code and to generate the second clock signal, wherein the scheduler controller is configured to generate the second count code based on a first adjustment code and a second adjustment code, and wherein the clock circuit is further configured to: based on identifying a phase difference between the data signal and the clock signal, cause one or more first loop operations to be performed through the first loop until the phase difference is eliminated, obtain a first value of the first count code by causing one or more of the one or more first loop operations to be performed while a level of the power voltage is a first power voltage level, and store the first value as the first adjustment code, obtain a second value of the first count code by causing one or more of the one or more first loop operations to be performed while the level of the power voltage is a second power voltage level higher than the first power voltage level, and store the second value as the second adjustment code, and based on identifying a difference between a first slope representing a change in a delay of the data signal with respect to the first power voltage level and the second power voltage level and a second slope representing a change in the delay of the clock signal, cause one or more second loop operations to be performed through the second loop until the first slope and the second slope are identical.

According to an aspect of the disclosure, an apparatus driven by a power voltage includes: a data input circuit including a sampler circuit configured to receive a data signal and latch the data signal in response to a clock signal provided by a clock delay scheduler; a clock circuit including: the clock delay scheduler; a clock buffer; a duty corrector; a first logic circuit; and a scheduler controller, wherein the clock circuit is configured to: receive, through the clock buffer, a first clock signal having a first swing width, convert the first clock signal into a second clock signal amplified to a second swing width greater than the first swing width, and adjust a skew between the data signal and the second clock signal, wherein a first loop includes the clock delay scheduler, the duty corrector, the sampler circuit, and a first count logic circuit, and a second loop includes the scheduler controller and the clock delay scheduler, wherein the duty corrector is configured to receive the first clock signal from the clock buffer and to adjust a duty cycle of the first clock signal based on a first count code, wherein the first count logic circuit is configured to receive the data signal from the sampler circuit and to generate the first count code based on a phase difference between the second clock signal and the data signal, wherein the clock delay scheduler is configured to receive the first clock signal from the duty corrector and adjust the first clock signal based on a second count code, wherein the scheduler controller is configured to generate the second count code based on a first adjustment code and a second adjustment code, and wherein the clock circuit is further configured to: obtain a first value of the first count code by causing one or more first loop operations to be performed through the first loop while a level of the power voltage is a first power voltage level, and store the first value as the first adjustment code, obtain a second value of the first count code by causing one or more of the one or more first loop operations to be performed through the first loop while the level of the power voltage is a second power voltage level higher than the first power voltage level, and store the second value as the second adjustment code, and based on identifying a difference between a first slope representing a change in a delay of the data signal with respect to the first power voltage level and the second power voltage level and a second slope representing a change in a delay of the clock signal, cause one or more second loop operations to be performed through the second loop until the first slope and the second are identical.

According to an aspect of the disclosure, a method for adjusting a skew between a data signal and a clock signal of an apparatus driven by a power voltage and including a sampler circuit that latches the data signal in response to the clock signal, includes: receiving the data signal through a data buffer of the apparatus; receiving the clock signal through a clock buffer of the apparatus; based on identifying a phase difference between the data signal and the clock signal, repeatedly performing one or more first loop operations through a first loop of the apparatus until the phase difference is eliminated, wherein the first loop includes the sampler circuit and a first count logic circuit; obtaining a first adjustment code by causing one or more of the one or more first loop operations to be performed through the first loop while a level of the power voltage is a first power voltage level; obtaining a second adjustment code obtained by causing one or more of the one or more first loop operations to be performed while the level of the power voltage is a second power voltage level higher than the first power voltage level; storing the first adjustment code and the second adjustment code in a scheduler controller of the apparatus; and based on identifying a difference between a first slope representing a change in a delay of the data signal with respect to the first power voltage level and the second power voltage level and a second slope representing a change in a delay of the clock signal, performing one or more second loop operations through a second loop of the apparatus until the first slope and the second slope are identical, wherein the second loop includes the scheduler controller and a clock delay scheduler of the apparatus.

BRIEF DESCRIPTION OF DRAWINGS

Embodiments of the disclosure will be more clearly understood from the following detailed description taken in conjunction with the accompanying drawings in which.

4

Figure 1:
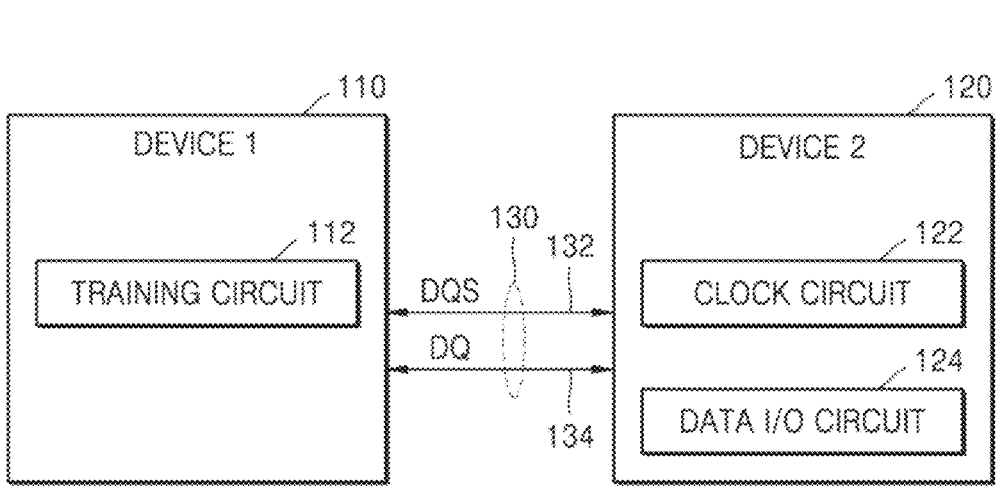
FIG. 1 is a block diagram of an apparatus according to an embodiment.
Figure 4:
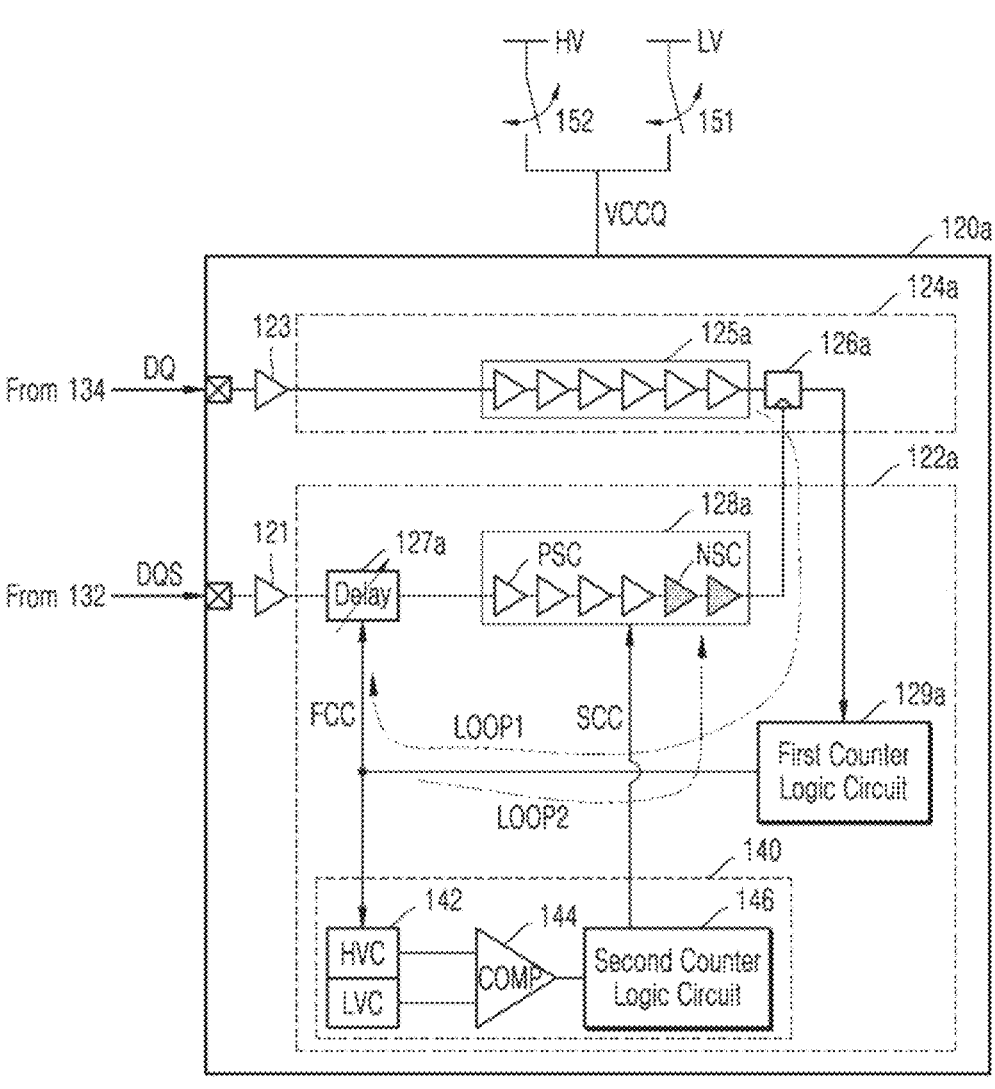
Figure 5:
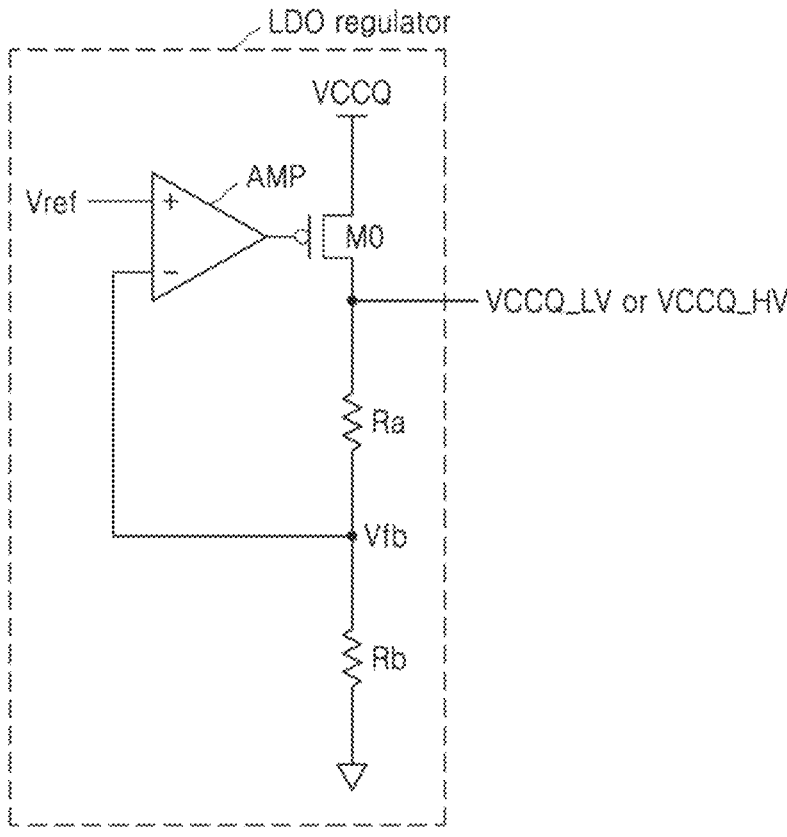
Figure 6A:
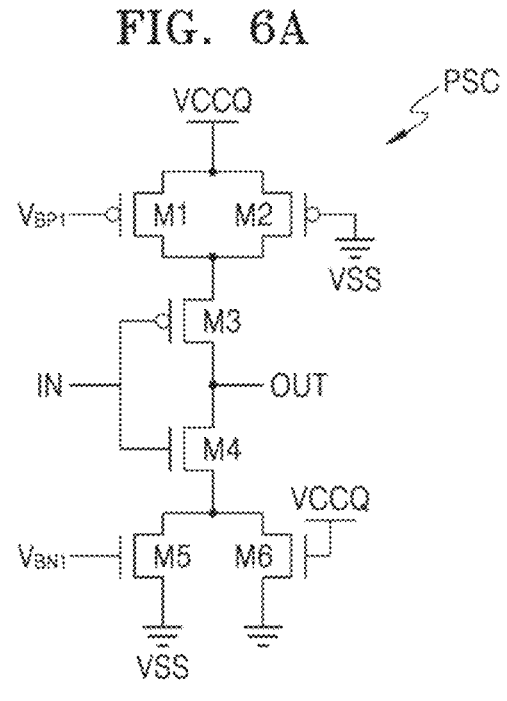
Figure 6B:
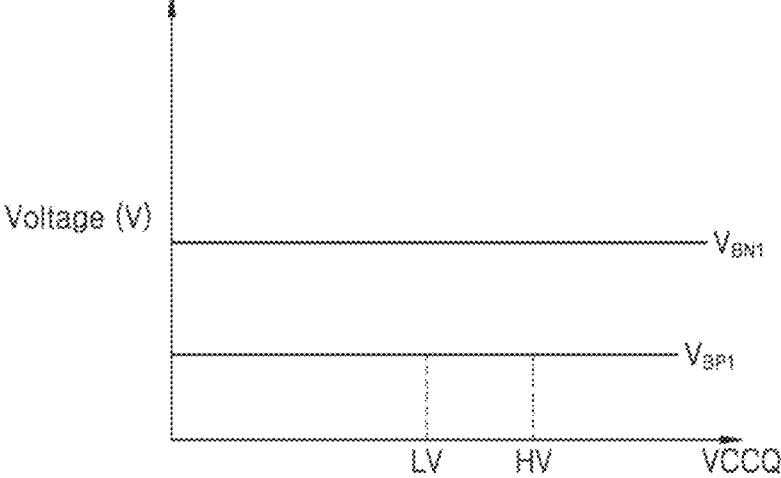
Figure 7A:
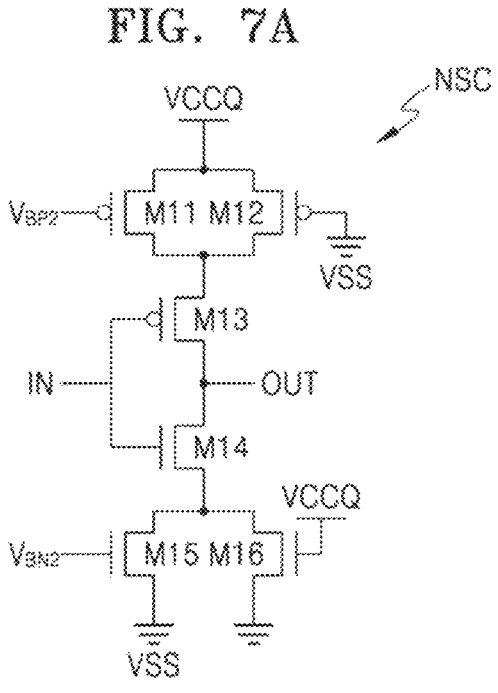
Figure 7B:
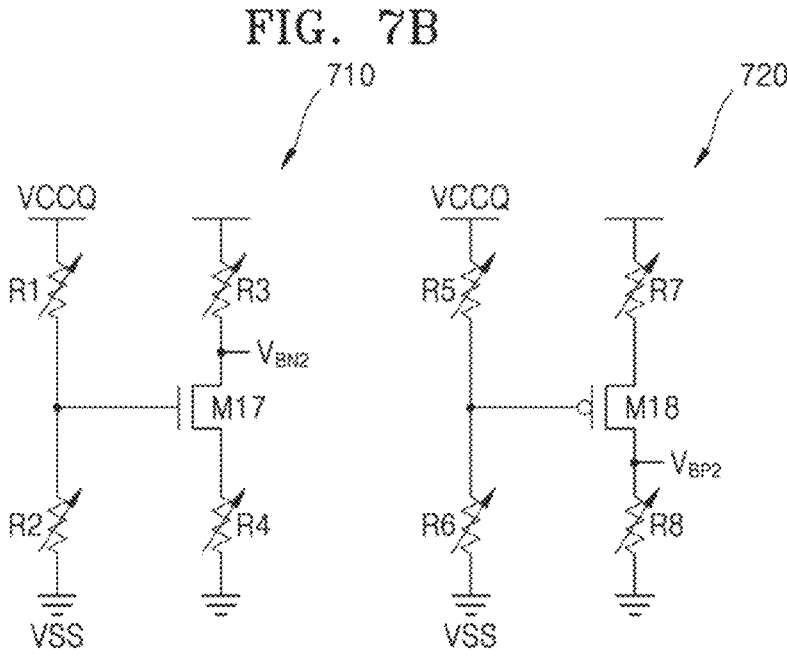
Figure 7C:
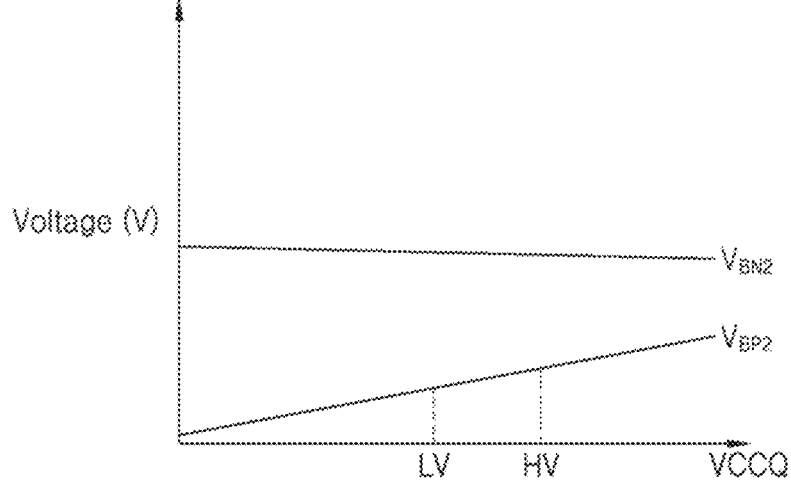
Figures 16A, 16B:
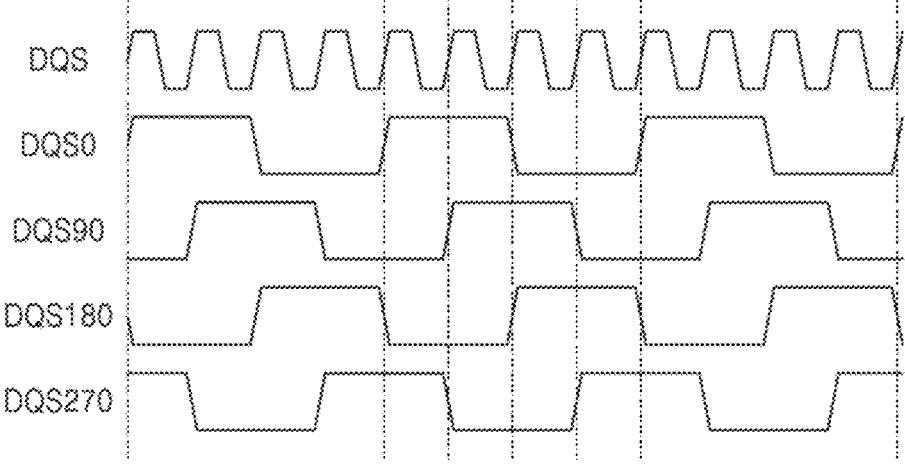
Figure 17:
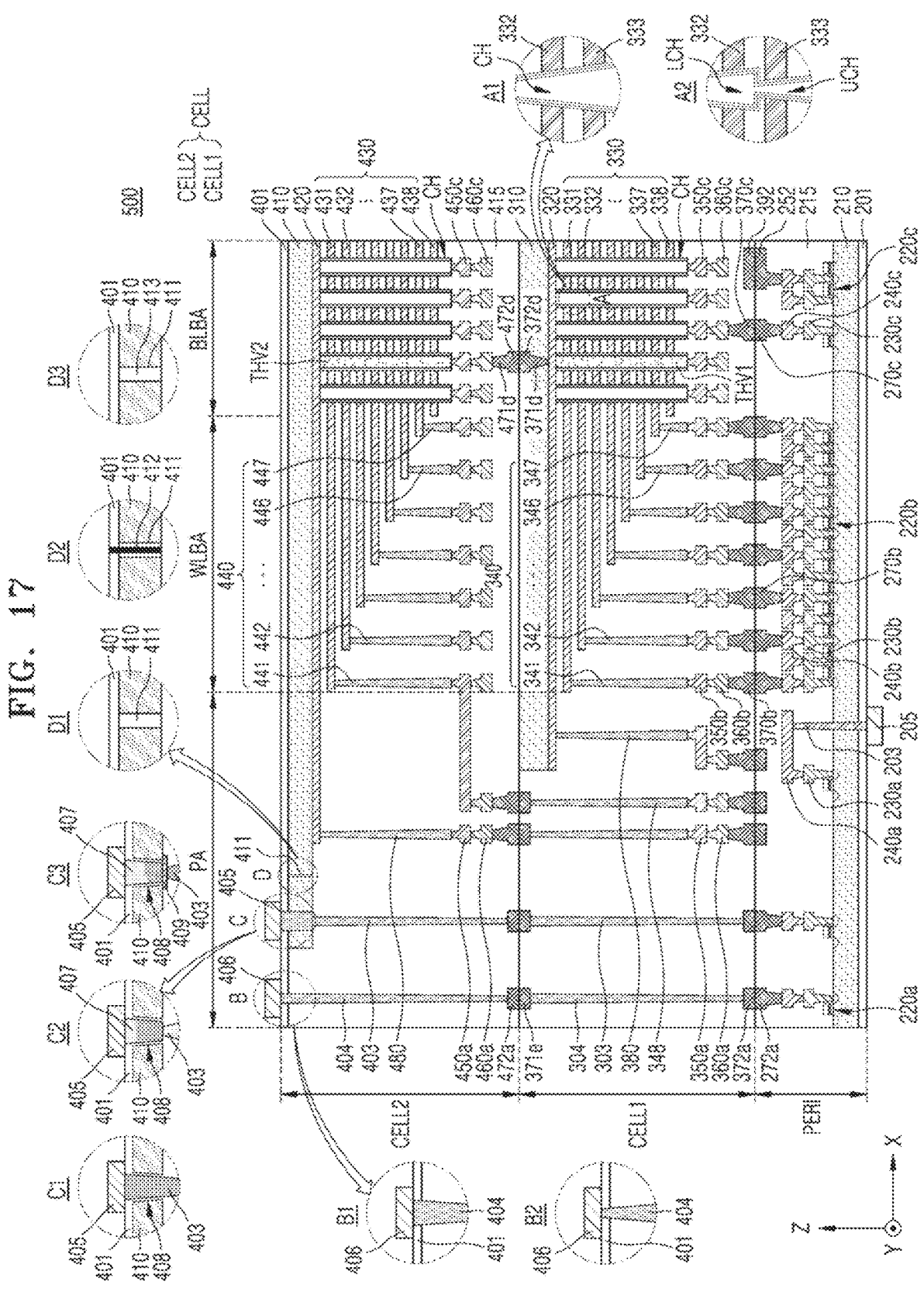
Figure 18:
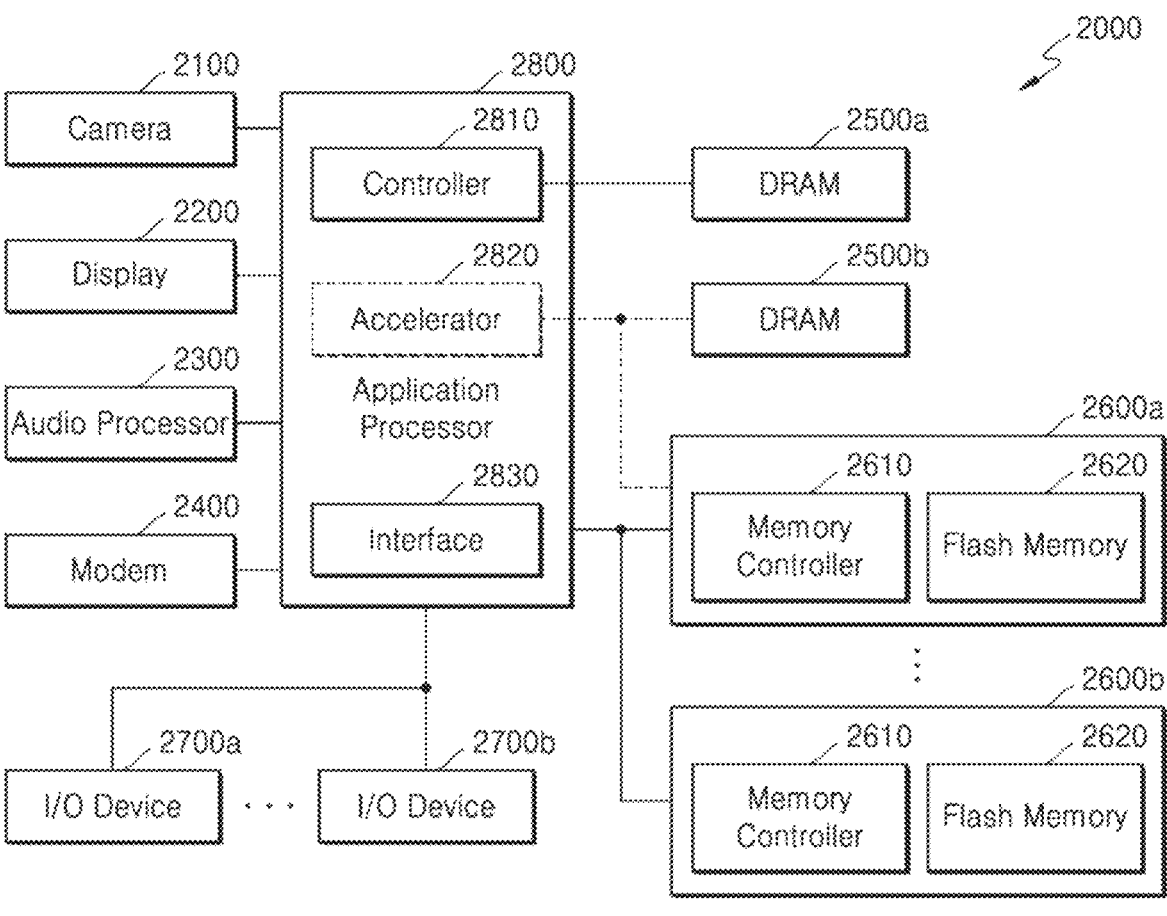

FIGS. 2, 3A, 3B, and 3C are diagrams for describing a typical clock training method for the memory device of FIG. 1;

FIG. 4 is a block diagram showing a memory device according to one or more embodiments;

FIG. 5 is a diagram for describing a voltage regulator according to one or more embodiments;

FIGS. 6A and 6B are diagrams for describing a first delay circuit having a positive delay, according to one or more embodiments;

FIGS. 7A, 7B, and 7C are diagrams for describing a second delay circuit having a negative delay, according to one or more embodiments;

FIGS. 8, 9, 10, 11A, 11B, and 11C are diagrams for describing an operating method of a memory device according to one or more embodiments;

FIGS. 12, 13, 14, and 15 are block diagrams for describing a memory device according to one or more embodiments;

FIGS. 16A and 16B are diagrams showing multi-phase clock signals used in a memory device according to one or more embodiments;

FIG. 17 is a cross-sectional view of a memory device having a bonding vertical NAND (B-VNAND) structure, according to an embodiment; and FIG. 18 is a block diagram of a system for describing an electronic device including an apparatus according to one or more embodiments.

DETAILED DESCRIPTION

FIG. 1 is a block diagram of an apparatus according to an embodiment.

Referring to FIG. 1, the apparatus 100 includes a first apparatus 110 and a second apparatus 120. The apparatus 100 may be implemented to be included in a personal computer (PC) or a mobile electronic device. The mobile electronic device may be implemented as a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, an internet of things (IoT) device, an internet of everything (IoE) device, or a drone.

For example, the apparatus 110 may be implemented by an integrated circuit (IC), a system-on-chip (SoC), an application processor (AP), a mobile AP, a chipset, or a set of chips. For example, the first apparatus 110 may be a semiconductor device that performs a memory control function, and the first apparatus 110 may be a component included in test equipment. The first apparatus 110 may include a memory controller, random access memory (RAM), a central processing unit (CPU), a graphics processing unit (GPU), and/or a test CPU.

The second apparatus 120 may be implemented as a memory device. The second apparatus 120 may be implemented as a non-volatile memory device, but the disclosure is not limited thereto. For example, the second apparatus 120 may include a NAND flash memory. According to another embodiment, the second apparatus 120 may include a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM).

Memory), a Ferroelectric Random Access Memory (FRAM), or a memory similar thereto.

The second apparatus 120 may also be implemented as a volatile memory device. For example, the second apparatus 120 may correspond to double data rate synchronous dynamic random access memory (DDR SDRAM), low power double data rate LPDD (LPDDR) SDRAM, graphics double data rate (GDDR) SDRAM, Rambus dynamic random access memory (RDRAM), etc. Alternatively, the second apparatus 120 may be implemented by a high bandwidth memory (HBM) or a Processor In Memory (PIM)-HBM.

Hereinafter, for convenience of explanation, the first apparatus 110 will be referred to as a memory controller, and the second apparatus 120 will be referred to as a memory device. Although a memory device 120 is shown as a single semiconductor chip, in reality, the memory device 120 may include n memory devices (where n is a non-zero whole number).

The memory device 120 may be coupled to a bus (or a channel) 130 that carries commands, addresses, data, and clocks. The memory controller 110 and the memory device 120 may communicate with each other through various buses 130. For example, commands and addresses may be received by the memory device 120 through a data bus 134, and data may be provided between the memory controller 110 and the memory device 120 via the data bus 134. The data bus 134 may include one or more signal lines, e.g., 8 signal lines, 16 signal lines, etc., through which signals representing commands, addresses, or data are provided.

A clock signal DQS may be provided between the memory controller 110 and the memory device 120 through a clock bus 132. The clock bus 132 may include signal lines for transmitting a data strobe signal DQS provided by the memory controller 110 to the memory device 120 or transmitting a data strobe signal DQS provided by the memory device 120 to the memory controller 110. A DQS signal may be used for timing of providing and receiving commands and addresses on the data bus 134 or may be used for timing of providing data. The clock bus 132 includes two signal lines providing clock signals DQS_t and DQS_c between the memory controller 110 and the memory device 120, and the clocks signals DQS_t and DQS_c are complementary to each other. Clock signals DQS are complementary when the rising edge of a first clock signal DQS_t occurs simultaneously with the falling edge of a second clock signal DQS_c and when the rising edge of the second clock signal DQS_c occurs simultaneously with the falling edge of the first clock signal DQS_t (i.e., when the phase difference is 180 degrees). Hereinafter, for convenience of explanation, the clock signals DQS_t and DQS_c clocks may be referred to as DQS clocks or DQS clock signals. Also, commands, addresses, or data on the data bus 134 may be referred to as DQ data.

The memory controller 110 may provide a command to the memory device 120 to perform a memory operation. Non-limiting examples of memory commands include an access command for accessing a memory, e.g., a read command for performing a read operation, a write (or program) command for performing a write (or program) operation, and a training command.

During a read operation, when a read command and an associated address are provided to the memory device 120 by the memory controller 110, the memory device 120 may receive the read command and the associated address and perform a read operation, thereby outputting read data DQ from a memory location corresponding to the associated address. The read data DQ may be provided to the memory controller 110 by the memory device 120 according to a timing related to reception of a read command. When a write (or program) command and an associated address are provided by the memory controller 110 to the memory device 120, the memory device 120 may receive the write (or program) command and the associated address and perform a write (or program) operation, thereby writing write data DQ from the memory controller 110 to a memory location corresponding to the associated address. The write data DQ may be provided to the memory device 120 by the memory controller 110 according to a timing related to reception of the write (or program) command.

The timing that is important in these operations may be based on the alignment of DQ data edges in correspondence to DQS clock edges. The memory controller 110 may include a training circuit 112 that performs memory training on the memory device 120. The training circuit 112 may perform a clock training operation regarding a DQS clock in response to a training command. DQ data edges may be aligned in response to DQS clock edges through the clock training.

The memory device 120 may include a clock circuit 122 and a data input/output circuit 124. The clock circuit 122 may provide a timing-adjusted DQS clock by adjusting a skew between DQ data and a DQS clock. The clock circuit 122 may perform a first loop operation through a first loop and a second loop operation through a second loop based on the phase difference between the DQ data and the DQS clock. The first loop operation may be performed until there is no phase difference between the DQ data and the DQS clock, and the second loop operation may be performed until a first slope representing a delay change of the DQ data becomes identical to a second slope representing a delay change of the DQS clock with respect to the level of a power voltage.

In one or more embodiments, the clock circuit 122 may receive a first clock signal having a first swing width, convert the first clock signal into a second clock signal amplified to a second swing width greater than the first swing width, and adjust a skew between DQ data and a second clock signal. The clock circuit 122 may generate multi-phase clock signals by dividing a received first clock signal by using a divider circuit and perform duty cycle adjustment on each of the multi-phase clock signals.

The data input/output circuit 124 may transmit read DQ data synchronized to a timing-adjusted DQS clock to the memory controller 110 and receive write DQ data synchronized to the timing-adjusted DQS clock from the memory controller 110. DQ data transmitted and received by the data input/output circuit 124 may have a data width of 8 bits. However, this is merely an example and is not intended to limit the disclosure.

FIGS. 2, 3A, 3B, and 3C are diagrams for describing a typical clock training method for the memory device of FIG. 1.

Figure 2:
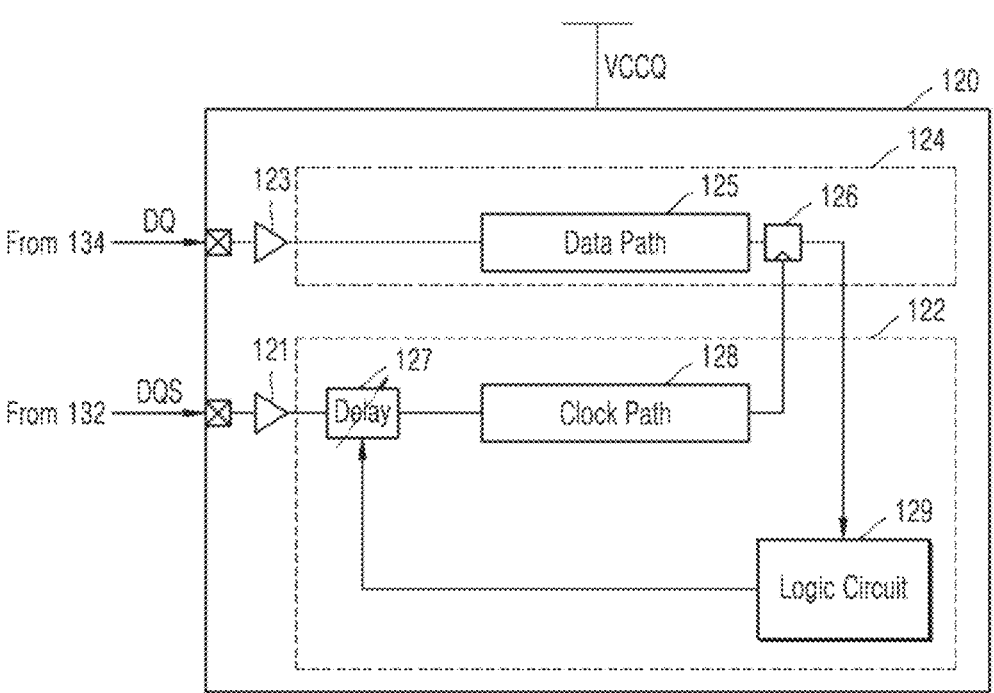

Referring to FIG. 2, the memory device 120 is driven by a power voltage VCCQ and may include a clock buffer 121, a clock circuit 122, a data buffer 123, and the data input/output circuit 124. The clock buffer 121 may receive a DQS clock on the clock bus 132 and provide the DQS clock to the clock circuit 122. Clock circuit 122 may include a variable delay circuit 127, a clock path 128, and a logic circuit 129. A DQS clock output from the clock buffer 121 may be provided to the variable delay circuit 127 and the clock path 128 and may be output after being delayed for a certain time. The variable delay circuit 127 is provided to reduce the timing deviation of the DQS clock and may output a DQS clock with an adjusted timing. An example deviation in clock timing may be a deviation due to a timing skew between DQ data and a DQS clock or distortion of the duty cycle of a DQS clock, i.e., 50% duty cycle.

The data buffer 123 may receive DQ data on the data bus 134 and provide the DQ data to the data input/output circuit 124. The data input/output circuit 124 may include a data path 125 and a sampler circuit 126. DQ data output from the data buffer 123 may be provided to the sampler circuit 126 through the data path 125. The sampler circuit 126 may latch DQ data of the data path 125 in response to the DQS clock of the clock path 128. The sampler circuit 126 may use an edge-triggered flip-flop. The sampler circuit 126 may experience a timing skew (sometimes called a clock skew) due to factors including a difference between lengths of wires, capacitive coupling, clock jitters, temperature change, and power voltage fluctuation. To reduce the timing deviation of the DQS clock, the logic circuit 129 may output the phase difference between DQ data latched on a DQS clock edge in the sampler circuit 126 as a code, and the variable delay circuit 127 may delay the DQS clock according to the code output from the logic circuit 129, thereby outputting a timing-adjusted DQS clock.

Figures 3A, 3B:
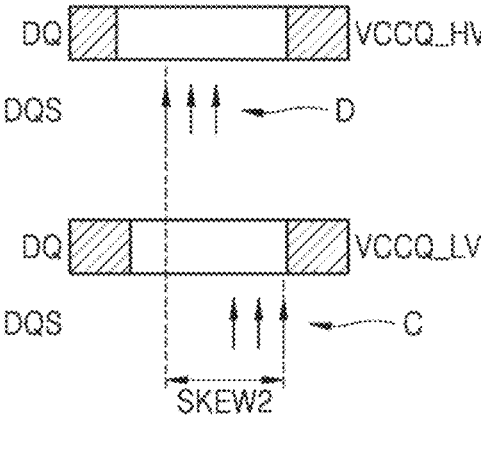

The memory device 120 may be affected by changes that randomly affect the entire system, such as a change in the power voltage VCCQ. For example, the level of the power voltage VCCQ may become lower than a target level (indicated as a "first voltage level VCCQ_LV") or higher than the target level (indicated as a "second voltage level VCCQ_HV"). The first voltage level VCCQ_LV and the second voltage level VCCQ_HV may belong to an allowable voltage range of the power voltage VCCQ provided to the memory device 120. In FIG. 3A, at the first voltage level VCCQ_LV, DQS clock edges A of the clock path 128 that latch DQ data by using an effective window (or an eye opening) EO1 of the DQ data on the data path 125 and the sampler circuit 126. The DQS clock edges A may vary at the central portion of the effective window EO1. At the second voltage level VCCQ_HV, an effective window EO2 of the DQ data on the data path 125 and DQS clock edges B of the clock path 128 may be seen, wherein the DQS clock edges B may vary at the edge portion of the effective window EO2. When the power voltage VCCQ of the memory device 120 changes between the first voltage level VCCQ_LV and the second voltage level VCCQ_HV, a DQS clock provided to the sampler circuit 126 may have a first skew SKEW1 in relation to DQ data. For the memory device 120 to function properly, the first skew SKEW1 needs to be reduced.

Figure 3C:
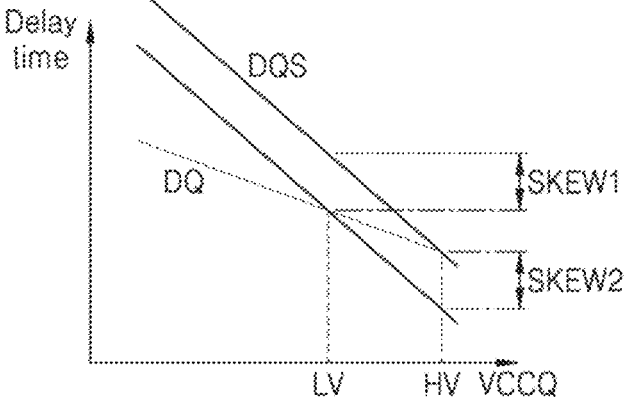

To reduce the first skew SKEW1, the memory device 120 may use the logic circuit 129 and the variable delay circuit 127 to output timing-adjusted DQS clock edges C and D. In FIG. 3B, timing-adjusted DQS clock edges C may occur within the effective window EO1 at the first voltage level VCCQ_LV, and timing-adjusted DQS clock edges D may occur within the effective window EO2 at the second voltage level VCCQ_HV. The DQS clock edges A of FIG. 3A are timing-changed relative to the DQS clock edges C of FIG. 3B at the first voltage level VCCQ_LV, and the DQS clock edges B of FIG. 3A are timing-changed relative to the DQS clock edges D of FIG. 3B at the second voltage level VCCQ_HV. Even when the skew according to a change in the power voltage VCCQ is reduced, a timing-adjusted DQS clock still has a second skew SKEW2. The method of reducing a skew refers to arithmetic adjustment of delay changes of a DQS clock according to a change in the power voltage VCCQ, as shown in FIG. 3C. FIG. 3C shows that the change (sometimes called slope) in the DQ data according to a change in the power voltage VCCQ and a change in the DQS clock according to a change in the power voltage VCCQ are different from each other, wherein the difference between the slope of the DQ data and the slope of the DQS clock may be related to skew adjustment. When the slope of the DQ data and the slope of the DQS clock according to a change in the power voltage VCCQ may be adjusted to be identical to each other (e.g., FIG. 11C), it will be beneficial in reducing the skew between the DQ data and the DQS clock.

FIG. 4 is a block diagram showing a memory device according to one or more embodiments. FIG. 5 is a diagram for describing a voltage regulator according to one or more embodiments. FIGS. 6A and 6B are diagrams for describing a first delay circuit having positive delay, according to one or more embodiments. FIGS. 7A, 7B, and 7C are diagrams for describing a second delay circuit having negative delay, according to one or more embodiments. A memory device 120a of FIG. 4 may function identically to the memory device 120 of FIG. 1. Hereinafter, letters attached to reference numerals (e.g., a of 120a, b of 120b, etc.) are used to identify a plurality of circuits having the same function. Hereinafter, descriptions regarding the memory device 120a of FIG. 4 identical to those given above with reference to FIG. 2 are not repeated.

Referring to FIG. 4, the memory device 120a may include switches 151 and 152 that provide the first power voltage VCCQ_LV or the second power voltage VCCQ_HV to a power voltage VCCQ line. However, this is merely an example and is not intended to limit the disclosure. According to an embodiment, the memory device 120a may not include the switches 151 and 152. In this embodiment, the first power voltage VCCQ_LV or the second power voltage VCCQ_HV may be provided to the power voltage VCCQ line in an operation of testing the memory device 120a.

According to one or more embodiments, the memory device 120a may generate the first power voltage VCCQ_LV or the second power voltage VCCQ_HV by using a voltage regulator of FIG. 5. The voltage regulator may be referred to as a low drop-out (LDO) regulator. The LDO regulator may include an amplifier AMP, a transistor M0, a first resistor Ra, and a second resistor Rb. The amplifier AMP may have a first input terminal (e.g., + input terminal) that receives a reference voltage Vref and a second input terminal (e.g., − input terminal) that receives a feedback voltage Vfb between the first resistor Ra and the second resistor Rb and amplify the difference between the reference voltage Vref and the feedback voltage Vfb. The transistor M0 may be a PMOS transistor connected between the power voltage VCCQ line and the first resistor Ra, wherein an output of the amplifier AMP is applied to a gate of the PMOS transistor. A connection node between the transistor M0 and the first resistor Ra may output the first power voltage VCCQ_LV or the second power voltage VCCQ_HV as an output of the LDO regulator. Here, when the level of the reference voltage Vref is set to the first power voltage level VCCQ_LV, the output of the LDO regulator may be output at the first power voltage level VCCQ_LV. When the level of the reference voltage Vref is set to the second power voltage level VCCQ_HV, the output of the LDO regulator may be output at the second power voltage level VCCQ_HV.

In FIG. 4, the memory device 120a may include the clock buffer 121 driven by the first power voltage VCCQ_LV or the second power voltage VCCQ_HV transmitted to the power voltage VCCQ line, a clock circuit 122a, the data buffer 123, and a data input/output circuit 124a. The clock circuit 122a may include a variable delay circuit 127a, a clock delay scheduler 128*a*, a first counter logic circuit 129*a*, and a scheduler controller 140. The variable delay circuit 127*a* may be configured to receive a DQS clock received by the clock buffer 121 as an input and delay the DQS clock in response to a first count code FCC output from the first counter logic circuit 129*a*.

According to one or more embodiments, the variable delay circuit 127*a* may include delay cells that are turned on/off according to the first count code FCC of the first counter logic circuit 129*a*. A delay cell that is turned on by the first count code FCC of the first counter logic circuit 129*a* has a certain amount of delay. On the other hand, a delay cell that is turned off by the first count code FCC of the first counter logic circuit 129*a* may be bypassed.

The clock delay scheduler 128*a* may delay the DQS clock until the slope of DQ data and the slope of the DQS clock according to a change in the power voltage VCCQ become identical to each other. The clock delay scheduler 128*a* may be configured to receive a delayed DQS clock output from the variable delay circuit 127 as an input and delay the DQS clock in response to a second count code SCC output from the scheduler controller 140.

According to one or more embodiments, the clock delay scheduler 128*a* may include a number of first delay circuits PSC that are considered to have positive delay and a plurality of second delay circuits NSC that are considered to have negative delay to increase or decrease the amount of delay that affects the delay of a DQS clock. The first delay circuits PSC and the second delay circuits NSC may be connected in series.

A first delay circuit PSC is configured such that the amount of delay is changed according to the increasing level of the power voltage VCCQ when the level of the power voltage VCCQ changes, which may be expressed that the first delay circuit PSC has a "positive sensitivity". A second delay circuit NSC is configured such that the amount of delay does not change according to the increasing level of the power voltage VCCQ when the level the power voltage VCCQ changes. Since a DQS clock will not be delayed unlike as the first delay circuit PSC, it may be expressed that the second delay circuit NSC has a "negative sensitivity".

Referring to FIG. 6A, the first delay circuit PSC includes PMOS transistors M1, M2, and M3 and NMOS transistors M4, M5, and M6 connected between the power voltage VCCQ line and a ground voltage VSS line. Transistors M3 and M4 may each be designed as an inverter having a DQS clock (denoted as "input signal IN") and an inverted output thereof (denoted as "output signal OUT"). Transistors M1 and M2 may be connected in parallel between the power voltage VCCQ line and one end of a transistor M3. A first bias voltage VBP1 may be applied to a gate of a transistor M1, and the ground voltage VSS may be applied to a gate of a transistor M2. Transistors M5 and M6 may be connected in parallel between one end of the M4 transistor and the ground voltage VSS. A second bias voltage VBN1 may be applied to a gate of a transistor M5, and the power voltage VCCQ may be applied to a gate of a transistor M6.

As shown in FIG. 6B, each of the first bias voltage VBP1 and the second bias voltage VBN1 may be maintained at a constant voltage level even when the level of the power voltage VCCQ increases or decreases. The level of the first bias voltage VBP1 may be set to be lower than that of the second bias voltage VBN1. The first delay circuit (PSC) may operate with a first driving current provided through the transistors M1 and M2 when the level of the power voltage VCCQ is the first power voltage level VCCQ_LV and may operate with a second driving current when the level of the power voltage VCCQ is the second power voltage level VCCQ_HV. Here, the first driving current will be less than the second driving current. Therefore, the first delay circuit PSC may exhibit an increased delay amount when the level of the power voltage VCCQ is the first power voltage level VCCQ_LV and a decreased delay amount when the level of the power voltage VCCQ is the second power voltage level VCCQ_HV. In other words, the first delay circuit PSC has a positive sensitivity in which the amount of delay changes according to the level of the power voltage VCCQ. However, this is merely an example and is not intended to limit the disclosure.

Referring to FIG. 7A, the second delay circuit NSC may include PMOS transistors M11, M12, and M13 and NMOS transistors M14, M15, and M16 configured similarly as the first delay circuit PSC of FIG. 7A. Transistors M11 and M12 may be connected in parallel between the power voltage VCCQ line and one end of a transistor M13 transistor, transistors M13 and M14 are designed as inverters having an input signal IN and an output signal OUT, which is an inverted signal of the input signal IN, and transistors M15 and M16 transistors may be connected in parallel between one end of a transistor M14 and the ground voltage VSS. A third bias voltage VBP2 may be applied to a gate of a transistor M11 transistor, and the ground voltage VSS may be applied to a gate of a transistor M12. A fourth bias voltage VBN2 may be applied to a gate of a transistor M15, and the power voltage VCCQ may be applied to a gate of a transistor M16.

The third bias voltage VBP2 and the fourth bias voltage VBN2 may be generated by a first voltage generation circuit 710 and a second voltage generation circuit 720 of FIG. 7B, respectively. The first voltage generation circuit 710 may include variable resistors R1, R2, R3, and R4 and a transistor M17, which is an NMOS transistor, connected between the power voltage VCCQ line and the ground voltage VSS line. A connection node between a resistor R1 and a resistor R2 connected in series between the power voltage VCCQ line and the ground voltage VSS line may be connected to a gate of the transistor M17, a resistor R3 may be connected between the power voltage VCCQ line and one end of the transistor M17, and a resistor R4 may be connected between the other end of the transistor M17 and the ground voltage VSS line. A voltage of the connection node between the resistor R3 and the transistor M17 may be output at the level of the fourth bias voltage VBN2.

The second voltage generation circuit 720 may include variable resistors R5, R6, R7, and R8 and a transistor M18, which is a PMOS transistor, connected between the power voltage VCCQ line and the ground voltage VSS line. A connection node between a resistor R5 and a resistor R6 connected in series between the power voltage VCCQ line and the ground voltage VSS line may be connected to a gate of the transistor M18, a resistor R7 may be connected between the power voltage VCCQ line and one end of the transistor M18, and a resistor R8 may be connected between the other end of the transistor M17 and the ground voltage VSS line. A voltage of the connection node between the resistor R3 and the transistor M18 may be output at the level of the third bias voltage VBP2.

For example, it is assumed that the third bias voltage VBP2 and the fourth bias voltage VBN2 have voltage levels as shown in FIG. 7C when the level of the power voltage VCCQ changes. Also, it is assumed that the fourth bias voltage VBN2 is identical to the second bias voltage VBN1 of FIG. 7B. However, this is merely an example and is not intended to limit the disclosure. FIG. 7C shows that the third bias voltage VBP2 increases to an incremental voltage level as the level of the power voltage VCCQ increases. The level of the third bias voltage VBP2 may decrease when the level of the power voltage VCCQ is the first power voltage level VCCQ_LV and may increase when the level of the power voltage VCCQ is the second power voltage level VCCQ_HV.

In the second delay circuit NSC, when the level of the power voltage VCCQ decreases to the first power voltage level VCCQ_LV, the level of the third bias voltage VBP2 may also decrease. When the level of the power voltage VCCQ increases to the second power voltage level VCCQ_HV, the level of the third bias voltage VBP2 may also increase. This means that the same driving current is provided through the transistors M11 and M12 for both the first power voltage VCCQ_LV and the second power voltage VCCQ_HV. Therefore, the second delay circuit NSC may exhibit the same (substantially constant) delay amount for both the first power voltage VCCQ_LV and the second power voltage VCCQ_HV. In other words, the second delay circuit NSC has a negative sensitivity in which the delay amount does not change according to the level of the power voltage VCCQ (substantially insensitive to a change in the power voltage VCCQ). However, this is merely an example and is not intended to limit the disclosure.

Referring back to FIG. 4, the clock delay scheduler 128a may delay a DQS clock by using the plurality of first delay circuits PSC and the plurality of second delay circuits NSC connected in series. The problem of the variable delay circuit 127a preceding the clock delay scheduler 128a is that, as described above with reference to FIGS. 3A, 3B, and 3C, even when a skew according to a change in the power voltage VCCQ is reduced, a timing-adjusted DQS clock still has the second skew SKEW2 for DQ data. The clock delay scheduler 128a is needed to completely remove the skew. The clock delay scheduler 128a may change the function of the second delay circuit NSC, which has negative sensitivity, to have positive sensitivity like the first delay circuit PSC. Changing the function of the second delay circuit NSC to be like the first delay circuit PSC means that, as a result, the number of first delay circuits PSC having positive sensitivity increases. In other words, as more first delay circuits PSC are added to the clock delay scheduler 128a, the slope of a DQS clock may be adjusted according to a change in the power voltage VCCQ. The slope of the DQ data and the slope of the DQS clock according to a change in the power voltage VCCQ may be adjusted to be identical to each other (e.g., FIG. 11C), thereby reducing the skew between the DQ data and the DQS clock.

DQ data received through the data buffer 123 and a data path 125a may be provided to a sampler circuit 126a. The sampler circuit 126a may latch DQ data in response to a DQS clock output from the clock delay scheduler 128a. The sampler circuit 126a may output a phase difference between the DQS clock and the DQ data and provide the phase difference to the first counter logic circuit 129a. The first counter logic circuit 129a may generate the first count code FCC by calculating the phase difference between the DQS clock and the DQ data. The first count code FCC is provided to the variable delay circuit 127a, and the variable delay circuit 127a may delay the DQS clock by using delay cells that are turned on/off according to bits of the first count code FCC. A first loop LOOP1 may be formed in the order of the variable delay circuit 127a, the clock delay scheduler 128a, the sampler circuit 126a, and the first counter logic circuit 129a. Several repetitive loops may be performed through the first loop LOOP1 until there is no phase difference between the DQS clock and the DQ data. According to another embodiment, the order of circuits forming the first loop LOOP1 may be changed. However, this is merely an example and is not intended to limit the disclosure.

According to one or more embodiments, first count codes FCC of the first counter logic circuit 129a may be divided in correspondence to (dependent on) two or more levels of the power voltage VCCQ. When the power voltage VCCQ of the memory device 120a is at the first power voltage level VCCQ_LV, the first count code FCC obtained as a result after several repetitive calculations through the first loop LOOP1 may be referred to as a first adjustment code LVC. When the power voltage VCCQ of the memory device 120a is at the second power voltage level VCCQ_HV, the first count code FCC obtained as a result after several repetitive calculations through the first loop LOOP1 may be referred to as a second adjustment code HVC. Although the present embodiment is described that the first count code FCC includes the first adjustment code LVC and the second adjustment code HVC, the disclosure is not limited thereto, and the first count code FCC may include a plurality of adjustment codes corresponding to a plurality of power voltage levels.

Based on the first adjustment code LVC and the second adjustment code HVC of the first counter logic circuit 129a, the scheduler controller 140 may generate the second count code SCC for controlling that the slope of the DQS clock according to a change in the power voltage VCCQ becomes identical to the slope of the DQ data. The scheduler controller 140 may include a register 142, a comparator 144, and a second count logic circuit 146. The register 142 may store bits of the first adjustment code LVC and bits of the second adjustment code HVC output from the first counter logic circuit 129a. The comparator 144 may compare the bits of the first adjustment code LVC and the bits of the second adjustment code HVC, and the second count logic circuit 146 may generate the second count code SCC based on the difference between the bits of the first adjustment code LVC and the bits of the second adjustment code HVC. The second count code SCC is provided to the clock delay scheduler 128a, and the clock delay scheduler 128a may change the function of the second delay circuit NSC having negative sensitivity to have positive sensitivity like the first delay circuit PSC, based on bits of the second count code SCC.

According to one or more embodiments, changing negative sensitivity of the second delay circuit NSC to positive sensitivity means that the level of third bias voltage VBP2 (e.g., FIG. 7C), which increases to an incremental voltage level as the power of the power voltage VCCQ increases, is fixed to a certain voltage level like the level of the first bias voltage level VBP1 (e.g., FIG. 6B). The second voltage generation circuit 720 of FIG. 7B may be configured to fix the resistance values of the variable resistors R5, R6, R7, and R8 based on the bits of the second count code SCC, thereby outputting the third bias voltage VBP2 having a constant voltage level regardless a change in the power voltage VCCQ. In this embodiment, the clock delay scheduler 128a may be reorganized, such that the number of the first delay circuits PSC substantially increases as the number of the second delay circuits NSC whose negative sensitivity is changed to positive sensitivity due to the bits of the second count code SCC increases.

A second loop LOOP2 may be formed in the order of the scheduler controller 140 and the clock delay scheduler 128a. Several repetitive loops are performed through the second loop LOOP2, which may be performed until the first adjustment code LVC and the second adjustment code HVC become identical to each other.

According to one or more embodiments, the reorganization of the clock delay scheduler 128a may be renewed until the slope of the DQ data according to a change in the power voltage VCCQ and the slope of the DQS clock become identical to each other by adjusting the slope of the DQS clock according to a change in the power voltage VCCQ based on the first adjustment code LVC and the second adjustment code HVC of the first count code FCC and the second count code SCC through the second loop LOOP2. Therefore, the skew between the DQ data and the DQS clock due to a change in the power voltage VCCQ may be reduced.

Figure 9:
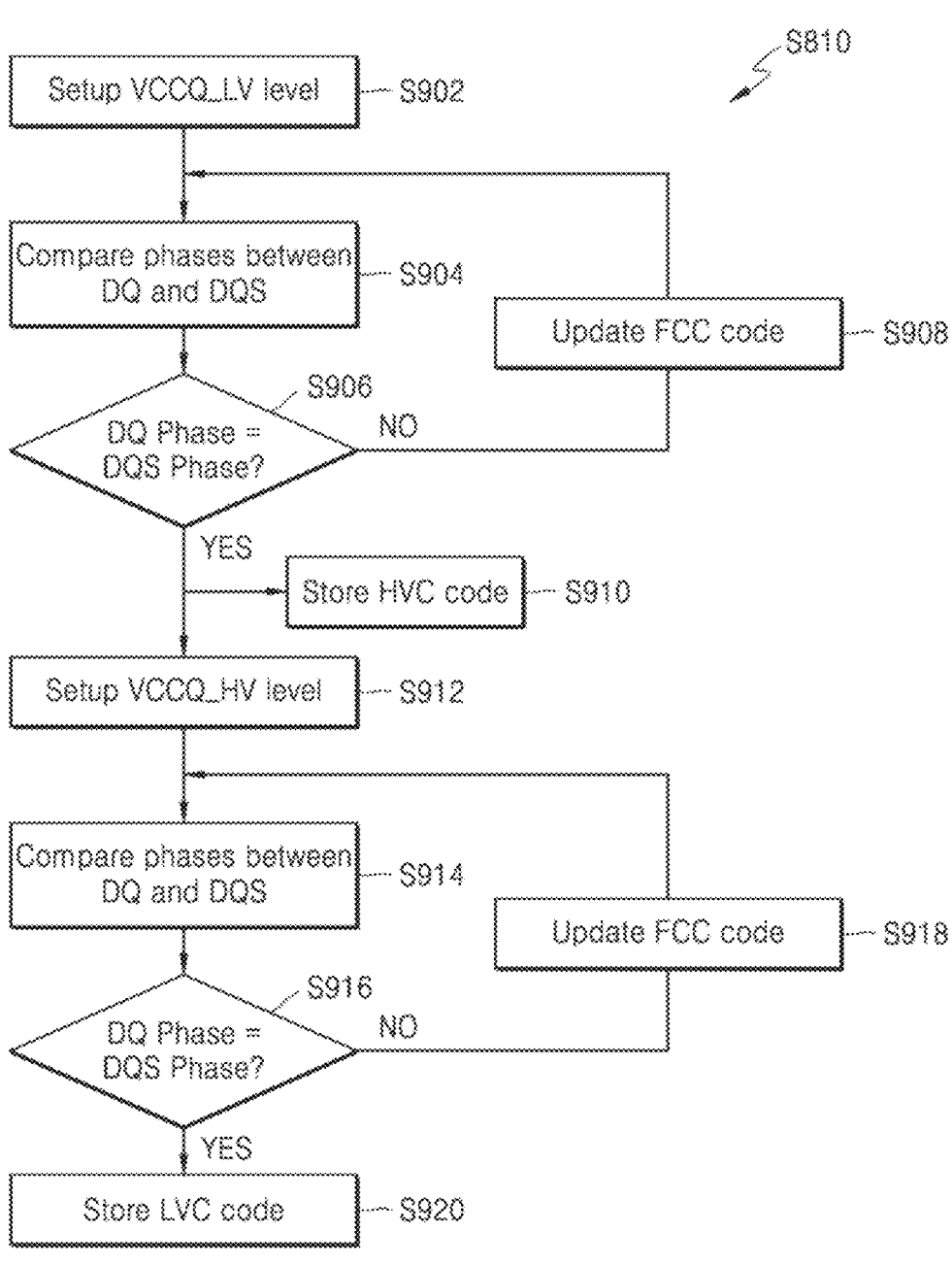
Figure 10:
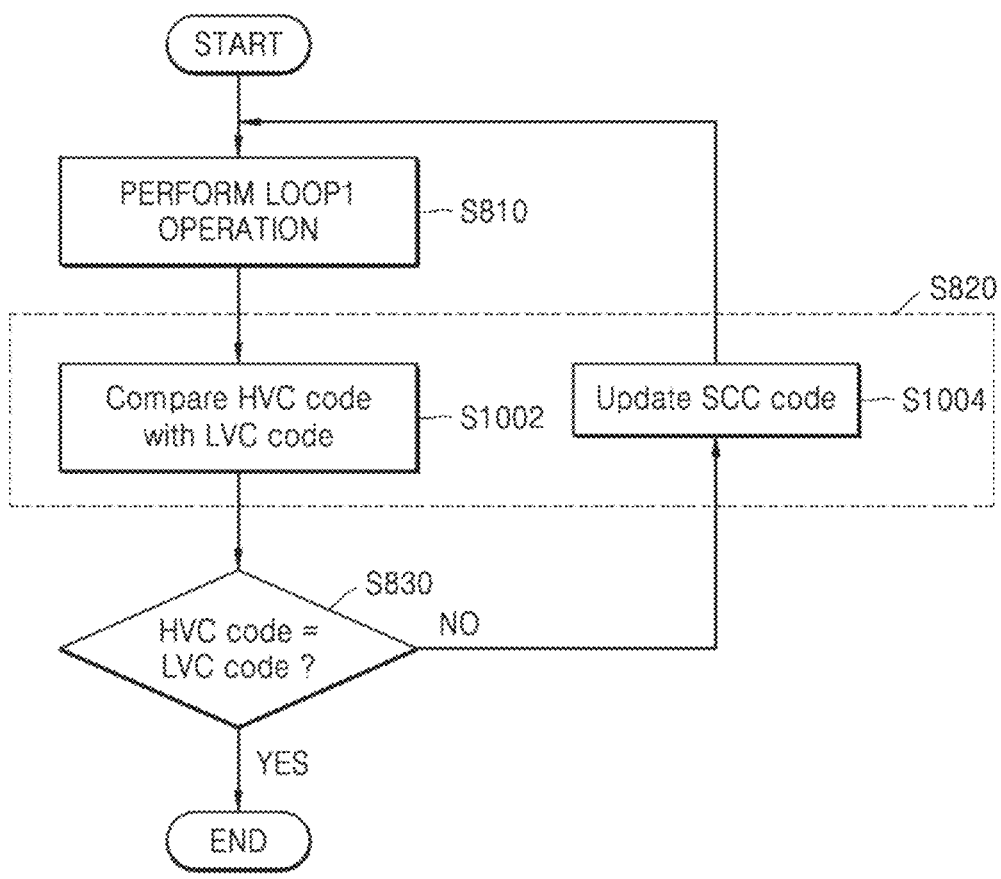
Figure 11A:
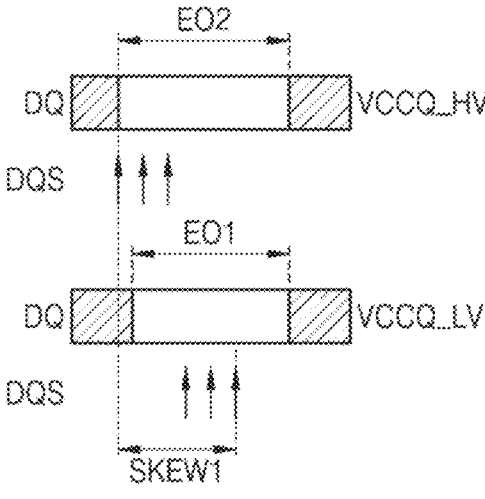
Figure 11B:
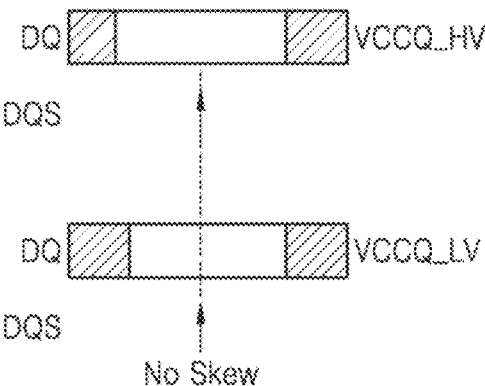

FIGS. 8, 9, 10, 11A, 11B, and 11C are diagrams for describing a method of operating a memory device according to one or more embodiments. FIG. 11A shows a clock skew (e.g., the first skew SKEW1 of FIG. 3A) prior to employing or implementing the methods of FIGS. 8, 9, and 10. FIG. 11B shows a zero clock skew after employing or implementing the methods of FIGS. 8, 9, and 10, and FIG. 11C shows matching between the slope of DQ data according to a change in the power voltage VCCQ and the slope of a DQS clock that may be achieved through embodiments.

Figure 8:
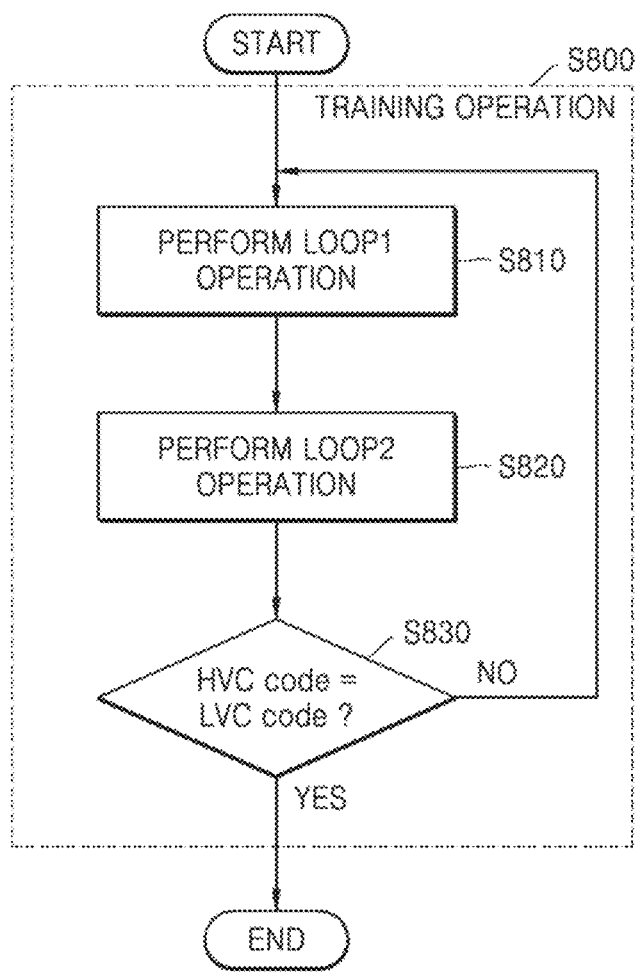

According to one or more embodiments, the methods of FIGS. 8, 9, and 10 (e.g., operation S700) may be utilized or performed by the memory device 120a shown in FIG. 4. In this embodiment, the memory device 120a performs an operation of reducing the skew between DQ data and a DQS clock according to a change in the power voltage VCCQ during a clock training performed between the memory controller 110 and the memory device 120a. However, this is merely an example and is not intended to limit the disclosure.

Referring to FIGS. 4 and 8, in operation S810, the first loop LOOP1 may be performed until there is no phase difference between the DQS clock and the DQ data for each of levels of the power voltage VCCQ of the memory device 120a. According to one or more embodiments, the first loop LOOP1 may be a loop in the order of the variable delay circuit 127a, the clock delay scheduler 128a, the sampler circuit 126a, and the first counter logic circuit 129a. The first count code FCC obtained as a result of several repetitive calculations through the first loop LOOP1 at the first power voltage level VCCQ_LV may be stored in the scheduler controller 140 as the first adjustment code LVC. The first count code FCC obtained as a result of several repetitive calculations through the first loop LOOP1 at the second power voltage level VCCQ_HV may be stored in the scheduler controller 140 as the second adjustment code HVC.

As shown in FIG. 9, the memory device 120a may set the power voltage VCCQ to the first power voltage level VCCQ_LV (operation S902), compare the phase of a DQS clock with the phase of DQ data through the first loop LOOP1 (operation S904), determine whether there is no phase difference therebetween (operation S906), renew the first count code FCC when there is a phase difference (operation S908), and repeatedly perform operations S904, S906, and S908 and store the first count code FCC obtained when there is no phase difference between the DQS clock and the DQ data as the first adjustment code LVC in the scheduler controller 140 (operation S910). The memory device 120a may set the power voltage VCCQ to the second power voltage level VCCQ_HV (operation S912), compare the phase of a DQS clock with the phase of DQ data through the first loop LOOP1 (operation S914), determine whether there is no phase difference therebetween (operation S916), renew the first count code FCC when there is a phase difference (operation S918), and repeatedly perform operations S904, S906, and S908 and store the first count code FCC obtained when there is no phase difference between the DQS clock and the DQ data as the second adjustment code HVC in the scheduler controller 140 (operation S920).

In operation S820, the second loop LOOP2 may be performed until the slope of the DQ data becomes identical to the slope of the DQS clock for each of levels of the power voltage VCCQ of the memory device 120a. According to one or more embodiments, the second loop LOOP2 may be a loop in the order of the scheduler controller 140 and the clock delay scheduler 128a. As shown in FIG. 10, the memory device 120a performs several repetitive loops through the second loop LOOP2 (operation S820), compare the first adjustment code LVC and the second adjustment code HVC by using the scheduler controller 140 (operation S1002), determine whether bits of the first adjustment code LVC are identical to bits of the second adjustment code HVC (operation S830), and, when there is a difference therebetween, renew the second count code SCC based on the difference (operation S1004). The memory device 120a may delay the DQS clock by changing the function of the second delay circuit NSC of the clock delay scheduler 128a from negative sensitivity to positive sensitivity based on the second count code SCC. In this embodiment, the clock delay scheduler 128a may be reorganized to add more first delay circuits PSCs with positive sensitivity.

Figure 11C:
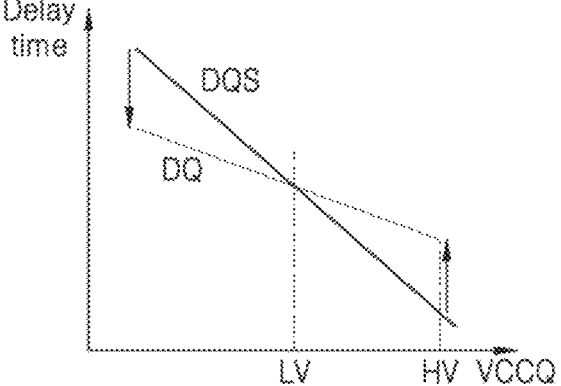

In operation S830, an operation of determining whether the first adjustment code LVC and the second adjustment code HVC are identical to each other for each of levels of the power voltage VCCQ of the memory device 120a may be performed. According to one or more embodiments, the clock training of the memory device 120a may be terminated when the first adjustment code LVC and the second adjustment code HVC are identical to each other. This may remove a DQS clock skew regarding DQ data to prevent influences from a change in the power voltage VCCQ (FIG. 11B) and equalize the slope of the DQ data according to a change in the power voltage VCCQ and the slope of the DQS clock (FIG. 11C). According to one or more embodiments, the memory device 120a may repeatedly perform operations S810 and S820 several times when the first adjustment code LVC and the second adjustment code HVC are not identical to each other.

FIGS. 12, 13, 14, and 15 are block diagrams for describing memory devices according to embodiments. FIGS. 16A and 16B show multi-phase clock signals used in memory devices according to embodiments.

Figure 12:
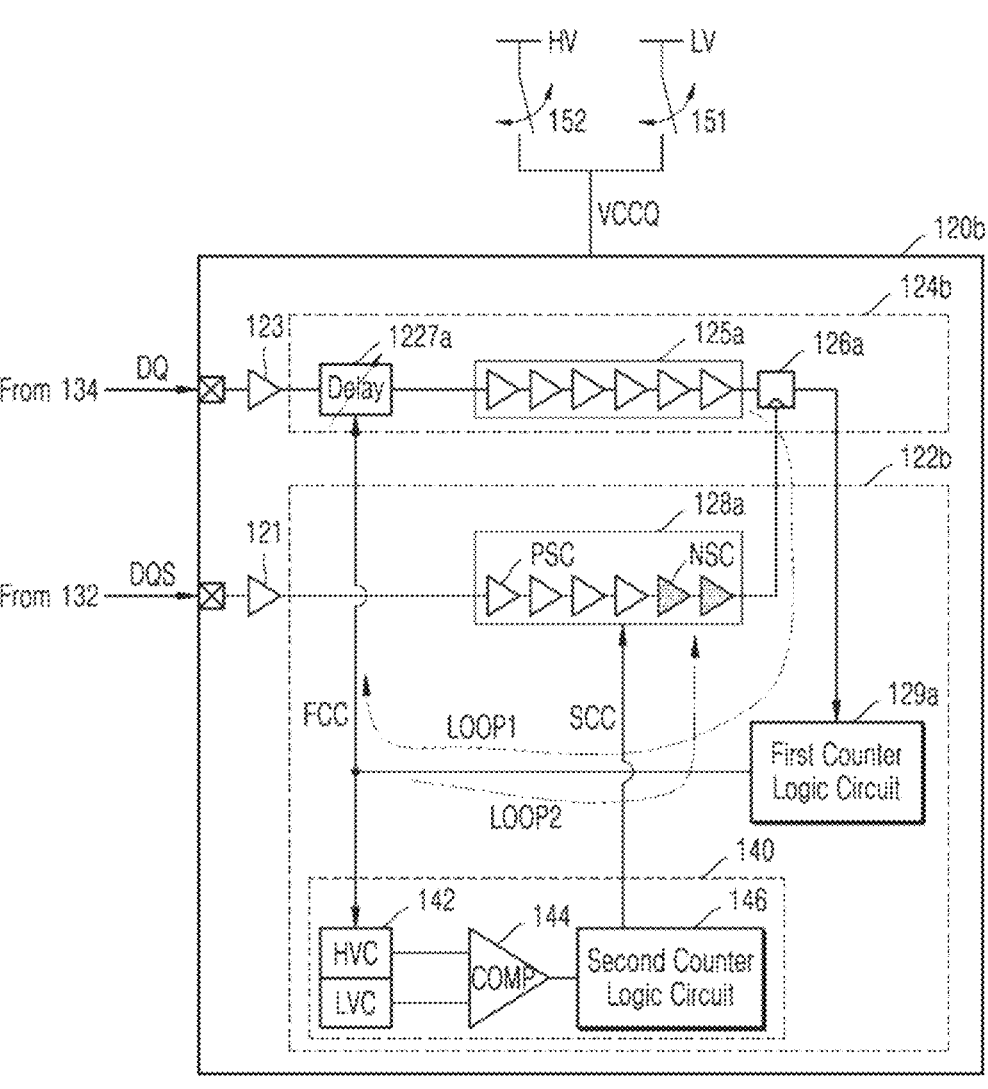

Referring to FIG. 12, compared to the memory device 120a of FIG. 4, in a memory device 120b, a variable delay circuit 1227a is included in a DQ data line instead of a DQS clock signal line and is a part of a data input/output circuit 124b. Hereinafter, descriptions identical to those given above for the memory device 120a will be omitted.

In the memory device 120b, the first loop LOOP1 may be formed in the order of the variable delay circuit 127a, the data path 125a, the sampler circuit 126a, and the first counter logic circuit 129a. The variable delay circuit 127a may be configured to receive DQ data received by the data buffer 123 as an input and delay the DQ data in response to the first count code FCC output from the first counter logic circuit 129a. Several repetitive loops may be performed through the first loop LOOP1 until there is no phase difference between the DQS clock and the DQ data. The memory device 120b may store the first adjustment code LVC regarding the first power voltage level VCCQ_LV and the second adjustment code HVC regarding the second power voltage level VCCQ_HV obtained as a result of performing several repetitive calculations through the first loop LOOP1 in the scheduler controller 140. The memory device 120*b* may perform several repetitive loops through the second loop LOOP2 in the order of the scheduler controller 140 and the clock delay scheduler 128*a* based on the first adjustment code LVC and the second adjustment code HVC until the slope of the DQ data and the slope of the DQS clock become identical to each other. When the first adjustment code LVC and the second adjustment code HVC are different from each other, the function of the second delay circuit NSC of the clock delay scheduler 128*a* may be changed from negative sensitivity to positive sensitivity to delay the DQS clock. Therefore, the memory device 120*b* may reduce the skew between the DQ data and the DQS clock due to a change in the power voltage VCCQ.

Figure 13:
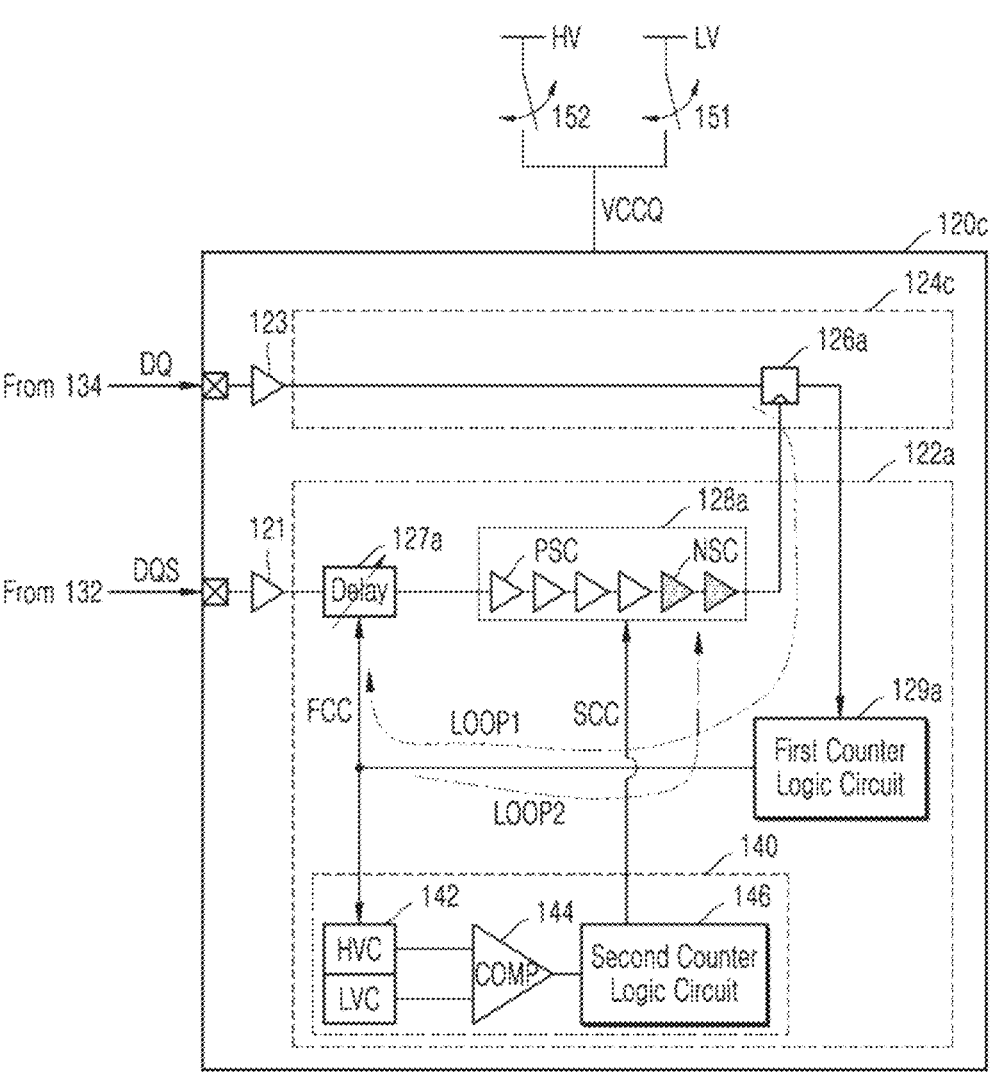

Referring to FIG. 13, compared to the memory device 120*a* of FIG. 4, in a memory device 120*c*, the data path 125*a* of FIG. 4 is not included in a data input/output circuit 124*c*. The data path 125*a* may include circuit elements that transfer DQ data, including, but not limited to, buffers, drivers, and/or flip-flops. Circuit elements of the data path 125*a* may be related to the determination of a trade-off between performance and power. For example, as more buffers (or other circuits) are added, more power may be consumed, but DQ data signaling characteristics may be improved. For example, the logic level of the DQ data may be accurately distinguished under poor DQ data line environment (e.g., interference distortion, reflection noise, and/or crosstalk). By eliminating circuit elements in the data path 125*a*, the amount of power consumption may be limited.

The memory device 120*c* may store the first adjustment code LVC regarding the first power voltage level VCCQ_LV and the second adjustment code HVC regarding the second power voltage level VCCQ_HV obtained as a result of several repetitive calculations through the first loop LOOP1 in the order of the variable delay circuit 127*a*, the clock delay scheduler 128*a*, and the first counter logic circuit 129*a* until there is no phase difference between the DQS clock and the DQ data. The memory device 120*c* may perform several repetitive loops through the second loop LOOP2 in the order of the scheduler controller 140 and the clock delay scheduler 128*a* based on the first adjustment code LVC and the second adjustment code HVC until the slope of the DQ data and the slope of the DQS clock become identical to each other. When the first adjustment code LVC and the second adjustment code HVC are different from each other, the function of the second delay circuit NSC of the clock delay scheduler 128*a* may be changed from negative sensitivity to positive sensitivity to delay the DQS clock. Therefore, the memory device 120*c* may reduce the skew between the DQ data and the DQS clock due to a change in the power voltage VCCQ.

Figure 14:
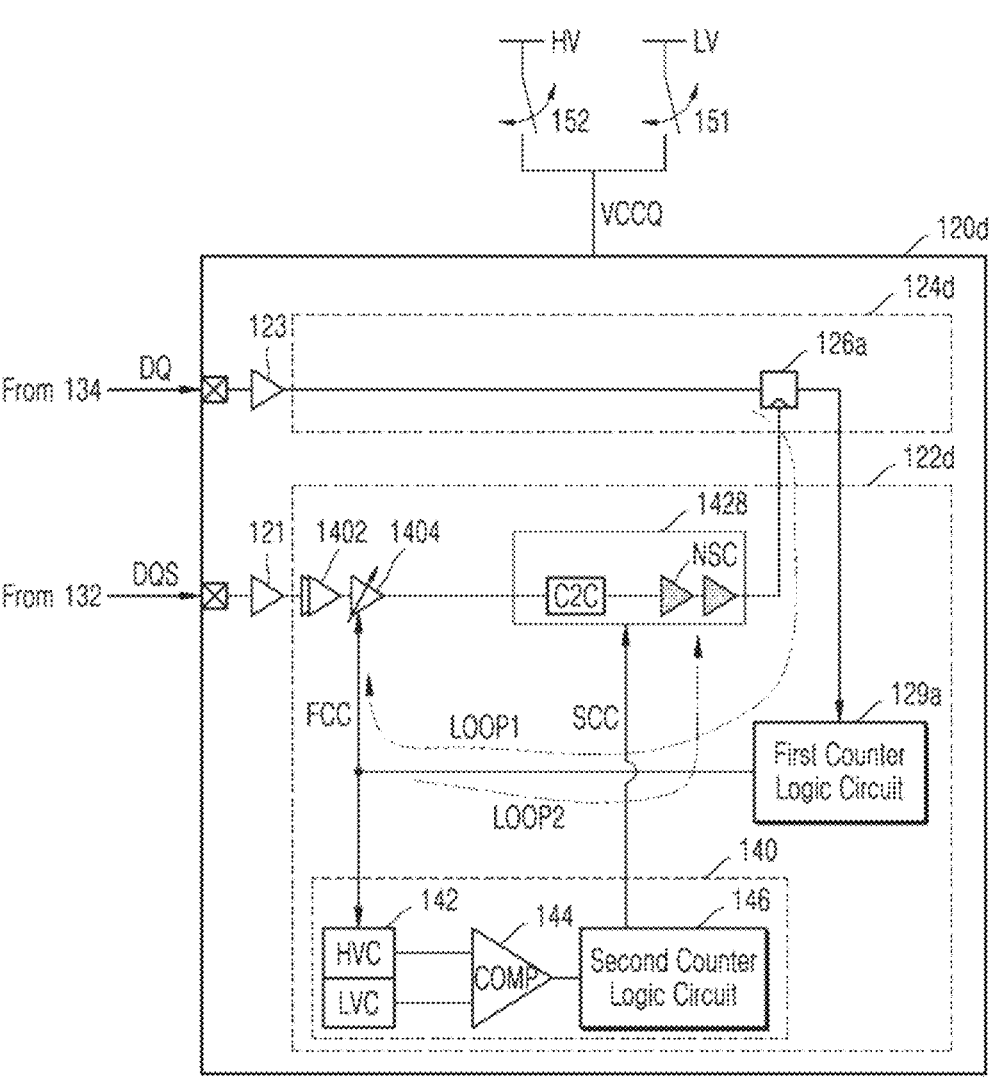

Referring to FIG. 14, a memory device 120*d* may use a signal swinging at a current mode logic (CML) level to a high-speed signal input/output (I/O) interface (e.g., transmitter/receiver). The CML level refers to a scheduled direct current (DC) level or an average level determined by according to a certain criterion. A signal swinging at the CML level is a signal that is toggled with an amplitude or a swing range based on the DC level called the CML level. The swing width of a CML level signal is relatively small as compared to the Complementary Metal Oxide Semiconductor (CMOS) level, which is the digital signal level of internal signals of a semiconductor device. A CMOS level signal fully swings from the level of the power voltage VDD level to the level of the ground voltage VSS. Since the swing width of a CML level signal is smaller than that of a CMOS level signal, the CML level signal may operate with relatively low power supply and high-speed switching.

Compared to the memory device 120*a* of FIG. 4, in a memory device 120*d*, the data path 125*a* is not included in a data input/output circuit 124*d*, and a clock circuit 122*d* includes a CML buffer 1402 and a duty corrector 1404. Also, compared to the memory device 120*a* of FIG. 4, in the memory device 120*d*, a clock delay scheduler 1428 includes a CMS-to-CMOS converter (C2C) and a plurality of second delay circuits NSC.

According to one or more embodiments, the CML buffer 1402 may include an amplifier circuit that amplifies the voltage difference between the voltage level of a DQS clock received through the clock buffer 121 and a reference voltage level. The duty corrector 1404 may adjust the duty cycle of a DQS clock provided from the CML buffer 1402 to an ideal value, i.e., 50%, and may be configured to correct a duty error of a DQS clock to 50% duty cycle in response to the first count code FCC output from the first counter logic circuit 129*a*. The CML-to-CMOS converter C2C may be configured to maintain data invariance when a DQS clock at the CML level is converted to a digital signal at the CMOS level. The CML-to-CMOS converter C2C may also be referred to as a level converter.

The memory device 120*d* may store the first adjustment code LVC regarding the first power voltage level VCCQ_LV and the second adjustment code HVC regarding the second power voltage level VCCQ_HV obtained as a result of several repetitive calculations through the first loop LOOP1 in the order of the duty corrector 1404, the clock delay scheduler 1428, and the first counter logic circuit 129*a* until there is no phase difference between the DQS clock and the DQ data. The memory device 120*d* may perform several repetitive loops through the second loop LOOP2 in the order of the scheduler controller 140 and the clock delay scheduler 128*a* based on the first adjustment code LVC and the second adjustment code HVC until the slope of the DQ data and the slope of the DQS clock become identical to each other. When the first adjustment code LVC and the second adjustment code HVC are different from each other, the function of the second delay circuit NSC of the clock delay scheduler 128*a* may be changed from negative sensitivity to positive sensitivity to delay the DQS clock. Therefore, the memory device 120*d* may reduce the skew between the DQ data and the DQS clock due to a change in the power voltage VCCQ.

Figure 15:
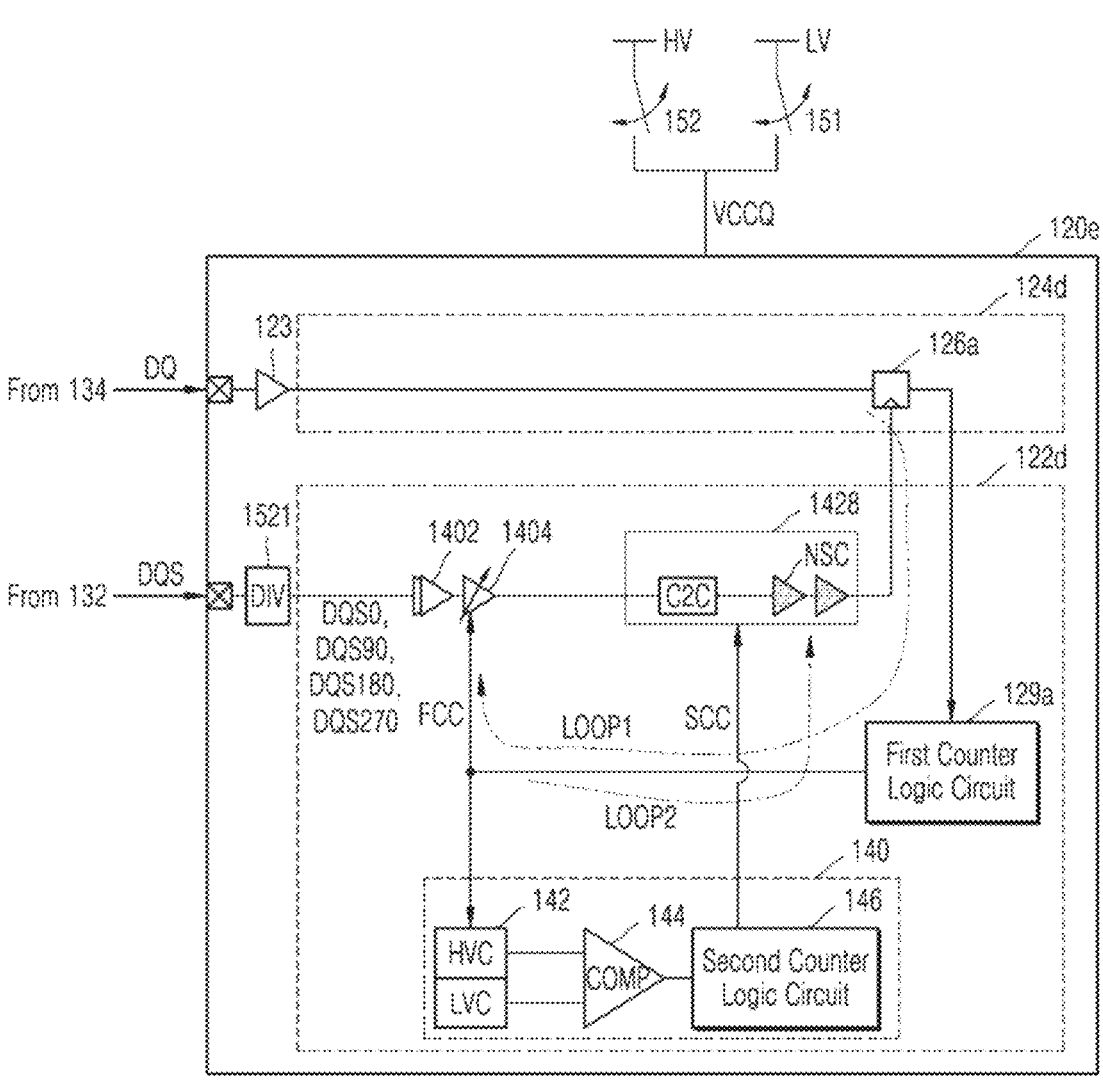

Referring to FIG. 15, compared to the memory device 120*d* of FIG. 14, a memory device 120*e* includes a divider circuit 1521 instead of the clock buffer 121. Hereinafter, descriptions identical to those given above for the memory device 120*d* will be omitted.

The divider circuit 1521 may receive a DQS clock on the clock bus 132 and output multi-phase clock signals DQS0, DQS90, DQS180, and DQS270 (FIGS. 16A and 16B) derived from the received DQS clock. According to one or more embodiments, a clock signal DQS0 may have a phase difference of 0 degrees from a DQS clock (no phase difference), a clock signal DQS90 may have a phase difference of 90 degrees from the DQS clock, a clock signal DQS180 may have a phase difference of 180 degrees from the DQS clock, and a clock signal DQS270 may have a phase difference of 270 degrees from the DQS clock. The multi-phase clock signals DQS0, DQS90, DQS180, and DQS270 affect the operation sequence and the pacing of the memory device 120*e*, and may have relatively low frequencies as compared to the DQS clock, which has a high frequency. This means that sufficient time is provided for the memory device 120*e* to operate by using the multi-phase clock signals.

The memory device 120e may store the first adjustment code LVC regarding the first power voltage level VCCQ_LV and the second adjustment code HVC regarding the second power voltage level VCCQ_HV obtained as a result of several repetitive calculations through the first loop LOOP1 in the order of the duty corrector 1404, the clock delay scheduler 1428, the sampler circuit 126a, and the first counter logic circuit 129a until there is no clock difference between each of the multi-phase clock signals DQS0, DQS90, DQS180, and DQS270 and the DQ data in the scheduler controller 140. The memory device 120e may perform several repetitive loops through the second loop LOOP2 in the order of the scheduler controller 140 and the clock delay scheduler 128a based on the first adjustment code LVC and the second adjustment code HVC until the slope of the DQ data and the slope of each of the multi-phase clock signals DQS0, DQS90, DQS180, and DQS270 become identical to each other. When the first adjustment code LVC and the second adjustment code HVC are different from each other, the function of the second delay circuit NSC of the clock delay scheduler 128a may be changed from negative sensitivity to positive sensitivity to delay the DQS clock. Therefore, the memory device 120e may reduce the skew between the DQ data and the DQS clock due to a change in the power voltage VCCQ.

FIG. 17 is a cross-sectional view of a memory device 500 having a bonding vertical NAND (B-VNAND) structure, according to an embodiment. The memory device 500 may partially or entirely combine the embodiments described above with reference to FIGS. 1 to 16B.

FIG. 17 is a view illustrating a memory device 500 according to one or more embodiments of the disclosure.

Referring to FIG. 17, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 500 may include the at least one upper chip including the cell region. For example, as illustrated in FIG. 17, the memory device 500 may include two upper chips. However, the number of the upper chips is not limited thereto. In a case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 17. However, embodiments of the disclosure are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments of the disclosure are not limited thereto. In certain embodiments, one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240a, 240b and 240c.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In one or more embodiments, as illustrated in a region "A1", the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (e.g., a Y-axis direction) parallel to the top surface of the second substrate 310.

In one or more embodiments, as illustrated in a region "A2", the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region "A2", a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

The number of the lower word lines 331 and 332 penetrated by the lower channel LCH is less than the number of the upper word lines 333 to 338 penetrated by the upper channel UCH in the region "A2". However, embodiments of the disclosure are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 17, the first through-electrode THV1 may penetrate the common source line 320 and the plurality of word lines 330. In certain embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In one or more embodiments, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer, and the bit line 360c may be electrically connected to the circuit elements 220c constituting the page buffer through an upper bonding metal pattern 370c of the first cell region CELL1 and an upper bonding metal pattern 270c of the peripheral circuit region PERI.

Referring continuously to FIG. 17, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In one or more embodiments, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Likewise, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 17, a lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In one or more embodiments, the third substrate 410 may not be disposed in a region in which the input/output contact plug is disposed. For example, as illustrated in a region "B", the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In one or more embodiments, as illustrated in a region "B1", the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region "A1" may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region "B2", the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region "C", the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In one or more embodiments, as illustrated in a region "C1", an opening 408 may be formed to penetrate the third substrate 410, and the second input/output contact plug 403 may be connected directly to the second input/output pad 405 through the opening 408 formed in the third substrate 410. In this case, as illustrated in the region "C1", a diameter of the second input/output contact plug 403 may become progressively greater toward the second input/output pad 405. However, embodiments of the disclosure are not limited thereto, and in certain embodiments, the diameter of the second input/output contact plug 403 may become progressively less toward the second input/output pad 405.

In certain embodiments, as illustrated in a region "C2", the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region "C2", a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region "C3", a stopper 409 may further be formed on a bottom end of the opening 408 of the third substrate 410, as compared with the embodiments of the region "C2". The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

In one or more embodiments, a slit 411 may be formed in the third substrate 410. For example, the slit 411 may be formed at a certain position of the external pad bonding region PA. For example, as illustrated in a region "D", the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In one or more embodiments, as illustrated in a region "D1", the slit 411 may be formed to penetrate the third substrate 410. For example, the slit 411 may be used to prevent the third substrate 410 from being finely cracked when the opening 408 is formed. However, embodiments of the disclosure are not limited thereto, and in certain embodiments, the slit 411 may be formed to have a depth ranging from about 60% to about 70% of a thickness of the third substrate 410.

In certain embodiments, as illustrated in a region "D2", a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region "D3", an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

In one or more embodiments, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In one or more embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

FIG. 18 is a block diagram of a system 2000 for describing an electronic device including an apparatus according to one or more embodiments.

Referring to FIG. 18, the system 2000 may include a camera 2100, a display 2200, an audio processor 2300, a modem 2400, DRAMs 2500a and 2500b, flash memories 2600a and 2600b, I/O devices 2700a and 2700b, and an application processor (AP) 2800. The system 2000 may be implemented as a laptop computer, a mobile phone, a smartphone, a tablet PC, a wearable device, a healthcare device, or an Internet of Things (IoT) device. Also, the system 2000 may be implemented as a server or a PC.

The camera 2100 may capture a still image or a video according to a user's control and may store captured image/video data or transmit the captured image/video data to the display 2200. The audio processor 2300 may process audio data included in the flash memories 2600a and 2600b or network content. The modem 2400 may transmit a modulated signal for wired/wireless data transmission/reception to a receiver and the modulated signal may be demodulated by the receiver to restore an original signal. The I/O devices 2700a and 2700b may include devices providing a digital input function and/or digital output function, e.g., a Universal Serial Bus (USB), a storage, a digital camera, a Secure Digital (SD) card, a Digital Versatile Disc (DVD), a network adapter, a touch screen, etc.

The AP 2800 may control the overall operation of the system 2000. The AP 2800 may include a control block 2810, an accelerator block or accelerator chip 2820, and an interface block 2830. The AP 2800 may control the display 2200, such that a part of content stored in the flash memories 2600a and 2600b is displayed on the display 2200. When a user input is received through the I/O devices 2700a and 2700b, the AP 2800 may perform a control operation corresponding to the user input. The AP 2800 may include an accelerator block, which is a circuit dedicated for calculation of Artificial Intelligence (AI) data, or may include an accelerator chip 2820 separately from the AP 2800. The DRAM 2500b may be additionally provided in the accelerator block or the accelerator chip 2820. The accelerator block is a functional block that specializes in performing a particular function of the AP 2800 and may include a GPU, which is a functional block that specializes in processing graphic data, a neural processing unit (NPU), which is a block that specializes in AI calculation and inference, and a data processing unit (DPU), which is a block that specializes in data transmission.

The system 2000 may include a plurality of DRAMs 2500a and 2500b. The AP 2800 may set up a DRAM interface protocol and communicate with the DRAMs 2500a and 2500b to control the DRAMs 2500a and 2500b through commands complying with the Joint Electron Device Engineering Council (JEDEC) standard and mode register (MRS) setting or to use company-specific functions such as low voltage/high-speed/reliability and a cyclic redundancy check (CRC)/error correction code (ECC) function. For example, the AP 2800 may communicate with the DRAM 2500a through an interface complying with the JEDEC standards such as LPDDR4 and LPDDR5, and the accelerator block or the accelerator chip 2820 may set and use a new DRAM interface protocol to control the DRAM 2500b for an accelerator, which has a greater bandwidth than the DRAM 2500a.

Although FIG. 18 shows only the DRAMs 2500a and 2500b, the disclosure is not limited thereto. As long as a bandwidth, a response speed, and voltage conditions of the AP 2800 or the accelerator chip 2820 are satisfied, any memory like a PRAM, an SRAM, an MRAM, an RRAM, an FRAM, or a Hybrid RAM may be used. The DRAMs 2500a and 2500b have relatively smaller latency and bandwidth than the I/O devices 2700a and 2700b or the flash memories 2600a and 2600b. The DRAMs 2500a and 2500b are initialized when the system 2000 is powered on and the OS and application data are loaded thereto, and thus the DRAMs 2500a and 2500b may be used as temporary storages for the OS and the application data or may be used as execution spaces for various software code.

In the DRAMs 2500a and 2500b, four arithmetic operations (i.e., addition, subtraction, multiplication, and division), vector calculations, address calculations, or Fast Fourier Transform (FFT) calculations may be performed. Also, in the DRAMs 2500a and 2500b, a function for an operation used for an inference may be performed. Here, the inference may be performed in a deep learning algorithm using an artificial neural network. The deep learning algorithm may include a training operation for learning a model through various data and an inference operation for recognizing data with the trained model. According to an embodiment, an image captured by a user through the camera 2100 is signal-processed and stored in the DRAM 2500b, and the accelerator block or accelerator chip 2820 may perform AI data calculation for recognizing data using data stored in the DRAM 2500b and a function used for inference.

The system 2000 may include a plurality of storages or flash memories 2600a and 2600b having a larger capacity than the DRAMs 2500a and 2500b. The accelerator block or accelerator chip 2820 may perform a training operation and an AI data calculation using the flash memories 2600a and 2600b. According to an embodiment, the flash memories 2600a and 2600b may include a memory controller 2610 and a flash memory device 2620, and a training operation and an inference AI data calculation performed by the AP 2800 and/or the accelerator chip 2820 may be performed more efficiently by using an arithmetic unit included in the memory controller 2610. The flash memories 2600a and 2600b may store images captured through the camera 2100 or data transmitted through a data network. For example, the flash memories 2600a and 2600b may store Augmented Reality/Virtual Reality content, High Definition (HD) content, or Ultra High Definition (UHD) content.

The system 2000 may perform a first loop operation through a first loop based on the phase difference between data and a clock to adjust the skew between the data and the clock due to a change in a power voltage during clock training between components and then perform a second loop operation through a second loop. The first loop operation may be performed until there is no phase difference between the data and the clock, and the second loop operation may be performed until a first slope representing a change in delay of the DQ data with respect to the levels of the power voltage and a second slope representing a change in delay of the DQS clock become identical to each other. Therefore, since skew does not occur between data and a clock due to power noise, the system 2000 may secure an effective data window margin in a high-speed data reception operation. The camera 2100, the display 2200, the audio processor 2300, the modem 2400, the DRAMs 2500a, 2500b, the flash memories 2600a, 2600b, the I/O devices 2700a and 2700b, and/or the AP 2800 in the system 2000 may partially or entirely combine the embodiments described above with reference to FIGS. 1 to 17.

While the disclosure has been particularly shown and described with reference to embodiments thereof, it will be understood that various changes in form and details may be made therein without departing from the spirit and scope of the following claims.

What is claimed is:

1. An apparatus driven by a power voltage, the apparatus comprising:
   a clock circuit comprising: a clock delay scheduler; a first count logic circuit; and a scheduler controller, wherein the clock circuit is configured to receive a clock signal and adjust a skew between a data signal and the clock signal; and
   a data input circuit comprising a sampler circuit configured to receive the data signal and latch the data signal in response to a second clock signal provided by the clock delay scheduler, wherein a first loop comprises the clock delay scheduler, the sampler circuit, and the first count logic circuit, and a second loop comprises the scheduler controller and the clock delay scheduler, wherein the first count logic circuit is configured to receive the data signal from the sampler circuit and to generate a first count code based on a phase difference between the clock signal and the data signal, wherein the clock delay scheduler is configured to adjust a delay of the clock signal based on a second count code and to generate the second clock signal, wherein the scheduler controller is configured to generate the second count code based on a first adjustment code and a second adjustment code, and wherein the clock circuit is further configured to:

based on identifying a phase difference between the data signal and the clock signal, cause one or more first loop operations to be performed through the first loop until the phase difference is eliminated, obtain a first value of the first count code by causing one or more of the one or more first loop operations to be performed while a level of the power voltage is a first power voltage level, and store the first value as the first adjustment code, obtain a second value of the first count code by causing one or more of the one or more first loop operations to be performed while the level of the power voltage is a second power voltage level higher than the first power voltage level, and store the second value as the second adjustment code, and based on identifying a difference between a first slope representing a change in a delay of the data signal with respect to the first power voltage level and the second power voltage level and a second slope representing a change in the delay of the clock signal, cause one or more second loop operations to be performed through the second loop until the first slope and the second slope are identical.

2. The apparatus of claim 1, wherein the clock circuit further comprises a variable delay circuit configured to delay the clock signal based on the first count code, and wherein the first loop further comprises the variable delay circuit.

3. The apparatus of claim 1, wherein the clock delay scheduler comprises a plurality of first delay circuits and a plurality of second delay circuits connected in series, to which the clock signal is input, wherein the plurality of first delay circuits are configured to have a positive sensitivity in which a delay amount changes in response to the first power voltage level and the second power voltage level, and the plurality of second delay circuits are configured to have a negative sensitivity in which the delay amount does not change, and wherein the clock circuit is further configured to:

increase a number of the plurality of first delay circuits by causing at least one second delay circuit of the plurality second delay circuits to change from the negative sensitivity to the positive sensitivity.

4. The apparatus of claim 1, wherein the scheduler controller comprises:

a register configured to store the first adjustment code and the second adjustment code;

a comparator configured to compare the first adjustment code and the second adjustment code; and a second count logic circuit configured to generate the second count code based on a difference between the first adjustment code and the second adjustment code.

5. The apparatus of claim 1, wherein the data input circuit further comprises a circuit element configured to transfer the data signal to the sampler circuit.

6. The apparatus of claim 1, further comprising a voltage regulator configured to provide the first power voltage level or the second power voltage level to a power voltage line.

7. The apparatus of claim 2, wherein the variable delay circuit comprises a delay cell configured to be turned on or turned off according to the first count code.

8. The apparatus of claim 5, wherein the data input circuit further comprises a variable delay circuit configured to delay the data signal based on the first count code, and wherein the first loop further comprises the variable delay circuit and the circuit element.

9. The apparatus of claim 8, wherein the variable delay circuit comprises a delay cell configured to be turned on or turned off according to the first count code.

10. An apparatus driven by a power voltage, the apparatus comprising:

a data input circuit comprising a sampler circuit configured to receive a data signal and latch the data signal in response to a clock signal provided by a clock delay scheduler; and a clock circuit comprising: the clock delay scheduler; a clock buffer; a duty corrector; a first logic circuit; and a scheduler controller, wherein the clock circuit is configured to:

receive, through the clock buffer, a first clock signal having a first swing width, convert the first clock signal into a second clock signal amplified to a second swing width greater than the first swing width, and adjust a skew between the data signal and the second clock signal, wherein a first loop comprises the clock delay scheduler, the duty corrector, the sampler circuit, and a first count logic circuit, and a second loop comprises the scheduler controller and the clock delay scheduler, wherein the duty corrector is configured to receive the first clock signal from the clock buffer and to adjust a duty cycle of the first clock signal based on a first count code, wherein the first count logic circuit is configured to receive the data signal from the sampler circuit and to generate the first count code based on a phase difference between the second clock signal and the data signal, wherein the clock delay scheduler is configured to receive the first clock signal from the duty corrector and adjust the first clock signal based on a second count code, wherein the scheduler controller is configured to generate the second count code based on a first adjustment code and a second adjustment code, and wherein the clock circuit is further configured to:

obtain a first value of the first count code by causing one or more first loop operations to be performed through the first loop while a level of the power voltage is a first power voltage level, and store the first value as the first adjustment code, obtain a second value of the first count code by causing one or more of the one or more first loop operations to be performed through the first loop while the level of the power voltage is a second power voltage level higher than the first power voltage level, and store the second value as the second adjustment code, and based on identifying a difference between a first slope representing a change in a delay of the data signal with respect to the first power voltage level and the second power voltage level and a second slope representing a change in a delay of the clock signal, cause one or more second loop operations to be performed through the second loop until the first slope and the second are identical.

11. The apparatus of claim 10, wherein the clock delay scheduler comprises: a level conversion circuit configured to convert the first clock signal into the second clock signal; and a plurality of delay circuits, wherein the plurality of delay circuits are configured to have a negative sensitivity in which a delay amount does not change in response to the first power voltage level and the second power voltage level, and wherein the clock circuit is further configured to:
increase, based on the second count code, a number of the plurality of delay circuits by causing at least one delay circuit of the plurality of delay circuits to operate with a positive sensitivity in which the delay amount changes with respect to the first power voltage level and the second power voltage level.

12. The apparatus of claim 10, wherein the scheduler controller comprises:

a register configured to store the first adjustment code and the second adjustment code;

a comparator configured to compare the first adjustment code and the second adjustment code; and a second count logic circuit configured to generate the second count code based on a difference between the first adjustment code and the second adjustment code.

13. The apparatus of claim 10, wherein the clock buffer comprises a divider circuit configured to receive the first clock signal and to generate a multi-phase clock signal, wherein the multi-phase clock signal comprises a first phase clock signal, a second phase clock signal, a third phase clock signal, and a fourth phase clock signal, each generated by dividing the first clock signal, and wherein each of the first phase clock signal, the second phase clock signal, the third phase clock signal, and the fourth phase clock signal are provided to the duty corrector.

14. The apparatus of claim 10, further comprising a voltage regulator configured to provide the first power voltage level or the second power voltage level to a power voltage line.

15. A method for adjusting a skew between a data signal and a clock signal of an apparatus driven by a power voltage and including a sampler circuit that latches the data signal in response to the clock signal, the method comprising:

receiving the data signal through a data buffer of the apparatus;

receiving the clock signal through a clock buffer of the apparatus;

based on identifying a phase difference between the data signal and the clock signal, repeatedly performing one or more first loop operations through a first loop of the apparatus until the phase difference is eliminated, wherein the first loop includes the sampler circuit and a first count logic circuit;

obtaining a first adjustment code by causing one or more of the one or more first loop operations to be performed through the first loop while a level of the power voltage is a first power voltage level;

obtaining a second adjustment code by causing one or more of the one or more first loop operations to be performed while the level of the power voltage is a second power voltage level higher than the first power voltage level;

storing the first adjustment code and the second adjustment code in a scheduler controller of the apparatus; and based on identifying a difference between a first slope representing a change in a delay of the data signal with respect to the first power voltage level and the second power voltage level and a second slope representing a change in a delay of the clock signal, performing one or more second loop operations through a second loop of the apparatus until the first slope and the second slope are identical, wherein the second loop includes the scheduler controller and a clock delay scheduler of the apparatus.

16. The method of claim 15, wherein the apparatus further includes a variable delay circuit connected to the clock buffer, and the first loop further includes the variable delay circuit, and wherein the performing of the one or more first loop operations through the first loop comprises:

based on the level of the power voltage being the first power voltage level, generating a first count code by comparing a phase of the data signal with a phase of the clock signal;

based on identifying a difference between the phase of the data signal and the phase of the clock signal, updating the first count code;

adjusting a delay amount of the variable delay circuit based on the first count code; and based on identifying that the difference between the phase of the data signal and the phase of the clock signal is eliminated, storing, in the scheduler controller, the first count code as the first adjustment code.

17. The method of claim 15, wherein the apparatus further includes a variable delay circuit connected to the clock buffer, and the first loop further includes the variable delay circuit, and wherein the performing of the one or more first loop operations through the first loop comprises:

based on the level of the power voltage being the second power voltage level, generating a first count code by comparing a phase of the data signal with a phase of the clock signal;

based on identifying a difference between the phase of the data signal and the phase of the clock signal, updating the first count code, adjusting a delay amount of the variable delay circuit based on the first count code; and based on identifying that the difference between the phase of the data signal and the phase of the clock signal is eliminated, storing, in the scheduler controller, the first count code as the second adjustment code.

18. The method of claim 15, wherein the clock delay scheduler includes a plurality of first delay circuits and a plurality of second delay circuits connected in series, wherein the plurality of first delay circuits are configured to have a positive sensitivity in which a delay amount changes in response to the first power voltage level and the second power voltage level, and the plurality of second delay circuits are configured to have a negative sensitivity in which the delay amount does not change, and wherein the performing of the one or more second loop operations through the second loop comprises increasing a number of the plurality of first delay circuits by causing at least second delay circuit of the plurality of second delay circuits to operate with the positive sensitivity.

19. The method of claim 15, wherein the apparatus further includes:

a circuit element configured to transfer the data signal to the sampler circuit; and a variable delay circuit connected to the clock buffer and configured to delay the data signal using the first count logic circuit, wherein the variable delay circuit and the circuit element are included in the first loop, and wherein the method further comprises delaying the data signal using the circuit element and the variable delay circuit.

20. The method of claim 15, wherein the receiving the clock signal through the clock buffer comprises:

receiving a first clock signal comprising a first swing width; and adjusting a duty cycle of the first clock signal.

* * * * *